United States Patent
Khoshnevisan et al.

(10) Patent No.: US 12,349,122 B2
(45) Date of Patent: Jul. 1, 2025

(54) TRANSMISSION CONFIGURATION INDICATOR STATE DETERMINATION BASED ON MULTIPLE CONTROL CHANNEL REPETITIONS

(71) Applicant: QUALCOMM Incorporated, San Diego, CA (US)

(72) Inventors: Mostafa Khoshnevisan, San Diego, CA (US); Yan Zhou, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 17/665,474

(22) Filed: Feb. 4, 2022

(65) Prior Publication Data
US 2023/0309085 A1  Sep. 28, 2023

(51) Int. Cl.
*H04W 72/1263* (2023.01)
*H04W 24/08* (2009.01)
(Continued)

(52) U.S. Cl.
CPC ....... *H04W 72/1263* (2013.01); *H04W 24/08* (2013.01); *H04W 72/046* (2013.01); *H04W 72/20* (2023.01); *H04W 72/23* (2023.01)

(58) Field of Classification Search
CPC ............. H04W 72/1263; H04W 24/08; H04W 72/046; H04W 72/20; H04W 72/23;
(Continued)

(56) References Cited

U.S. PATENT DOCUMENTS

| | | |
|---|---|---|
| 12,108,426 B2 | 10/2024 | Kim et al. |
| 2020/0267750 A1 | 8/2020 | Park et al. |

(Continued)

FOREIGN PATENT DOCUMENTS

| | | |
|---|---|---|
| WO | WO-2021157938 A1 | 8/2021 |
| WO | WO-2022145882 A1 | 7/2022 |
| WO | WO-2022154607 A1 | 7/2022 |

OTHER PUBLICATIONS

NTT Docomo, et al., "Enhancements on Multi-TRP/Panel Transmission", 3GPP TSG RAN WG1 #99, R1-1912893, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, 21 Pages, Nov. 8, 2019 (Nov. 8, 2019), XP051820229, the whole document.

(Continued)

*Primary Examiner* — Sharmin Chowdhury
(74) *Attorney, Agent, or Firm* — Paul M. McAdams; Holland & Hart LLP

(57) ABSTRACT

Methods, systems, and devices for wireless communications are described in which network nodes may configure linked search space (SS) sets that provide multiple instances of control channel communications. A beam configuration, or transmission configuration indicator (TCI) state, for a downlink transmission scheduled by instances of the control channel communications may be determined based on a control resource set (CORESET) of one or more of the different SS sets. A first network node may decode a first control channel communication from one or more instances of the control channel communications, the first control channel communication indicating a resource allocation for a first downlink communication. The first network node may determine whether one or more TCI states are applied to the first downlink communication based on one or more CORE-SETs associated with the first control channel communica- (Continued)

tion, and receive the first downlink communication based on the determined one or more TCI states.

23 Claims, 22 Drawing Sheets

(51) Int. Cl.
*H04W 72/044* (2023.01)
*H04W 72/20* (2023.01)
*H04W 72/23* (2023.01)

(58) Field of Classification Search
CPC ... H04B 7/0695; H04L 1/1854; H04L 1/1896; H04L 1/08; H04L 5/0058; H04L 5/0091; H04L 5/0053
See application file for complete search history.

(56) References Cited

U.S. PATENT DOCUMENTS

| | | | |
|---|---|---|---|
| 2020/0288479 A1* | 9/2020 | Xi | H04W 72/046 |
| 2021/0195601 A1 | 6/2021 | Khoshnevisan et al. | |
| 2022/0007371 A1 | 1/2022 | Kyung et al. | |
| 2022/0217694 A1 | 7/2022 | Kim et al. | |
| 2022/0361018 A1* | 11/2022 | Saber | H04L 5/0053 |
| 2022/0408468 A1 | 12/2022 | Jang et al. | |
| 2023/0050480 A1 | 2/2023 | Zhu et al. | |
| 2023/0112271 A1* | 4/2023 | Kim | H04L 5/0053 |
| | | | 370/329 |
| 2023/0125672 A1 | 4/2023 | Grossmann et al. | |
| 2023/0180033 A1 | 6/2023 | Cirik et al. | |
| 2023/0180249 A1 | 6/2023 | Bala et al. | |
| 2023/0209538 A1* | 6/2023 | Cirik | H04W 72/231 |
| | | | 370/329 |
| 2023/0224916 A1 | 7/2023 | Cirik et al. | |
| 2023/0254716 A1 | 8/2023 | Khoshnevisan et al. | |
| 2023/0284197 A1* | 9/2023 | Zhang | H04W 72/231 |
| | | | 370/225 |
| 2023/0308249 A1 | 9/2023 | Matsumura et al. | |
| 2023/0318761 A1 | 10/2023 | Jang et al. | |
| 2023/0354070 A1* | 11/2023 | Cirik | H04L 27/2602 |
| 2023/0363005 A1 | 11/2023 | Cirik et al. | |
| 2024/0023101 A1* | 1/2024 | Gao | H04L 5/0023 |
| 2024/0056987 A1 | 2/2024 | Cirik et al. | |
| 2024/0063880 A1 | 2/2024 | Ling et al. | |
| 2024/0089061 A1 | 3/2024 | Gao et al. | |
| 2024/0098531 A1 | 3/2024 | Gao et al. | |
| 2024/0129772 A1* | 4/2024 | Laddu | H04B 7/022 |
| 2024/0147496 A1 | 5/2024 | Ganesan et al. | |
| 2024/0154664 A1* | 5/2024 | Bhamri | H04L 5/0053 |
| 2024/0187199 A1 | 6/2024 | Gao et al. | |
| 2024/0235783 A1 | 7/2024 | Matsumura et al. | |
| 2024/0283616 A1 | 8/2024 | Gao et al. | |
| 2024/0430904 A1 | 12/2024 | Zhang et al. | |
| 2025/0008517 A1 | 1/2025 | Li | |

OTHER PUBLICATIONS

VIVO: "Remaining Issues on Multi-TRP for PDCCH, PUCCH and PUSCH Enhancements", 3GPP TSG RAN WG1 #107-e, R1-2110991, 3rd Generation Partnership Project (3GPP), Mobile Competence Centre, 650, Route Des Lucioles, F-06921 Sophia-Antipolis Cedex, France, vol. RAN WG1, No. e-Meeting, Nov. 11, 2021-Nov. 19, 2021, 21 Pages, Nov. 5, 2021 (Nov. 5, 2021), XP052073947, sections 2.4.1-2.4.4.

International Search Report and Written Opinion—PCT/US2022/054325—ISA/EPO—May 8, 2023.

Moderator (Qualcomm): "Summary #1 of Email Discussions [106-e-NR-feMIM0-03] for mTRP PDCCH Enhancements", 3GPP TSG-RAN WG1 Meeting #106-e, R1-2108254, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 16, 2021, XP052042084, 74 Pages, The Whole Document, p. 25-p. 61.

* cited by examiner

TRANSMISSION CONFIGURATION INDICATOR STATE DETERMINATION BASED ON MULTIPLE CONTROL CHANNEL REPETITIONS

INTRODUCTION

The following relates to wireless communications relating to transmission configuration indicator (TCI) state information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, nodes, devices, and apparatuses that support transmission configuration indicator (TCI) state determination based on multiple control channel repetitions. In accordance with various aspects, techniques are described for configuration of multiple TCI states and selection of a particular TCI state or TCI states of the multiple configured TCI states to be used for communications between nodes (e.g., between a user equipment (UE) and one or more transmission-reception points (TRPs) or base stations). In some cases, a node (e.g., a UE) may be configured with two TCI states for communications (e.g., based on a configured TCI codepoint that is associated with two TCI states). Another node (e.g., a base station or other network entity) may transmit control information (e.g., downlink control information (DCI)) that may provide a resource allocation for one or more communications and, in some cases, the control information may be used to determine the particular TCI state(s) for the associated communications.

In some cases, multiple instances of the control information (e.g., DCI) may be transmitted to a node, in order to enhance the likelihood of the node successfully receiving and decoding the control information. Such multiple instances (which may also be referred to as multiple repetitions) of control information may be transmitted in linked search space sets, where each search space set may provide one or more control information decoding candidates in a monitoring occasion. A node may be configured with linked search space sets by first control signaling, where each search space set has an associated control resource set (CORESET), and the node may monitor associated search spaces for the control information. Further, the node may receive second control signaling identifying one or more TCI states that are to be applied to one or more CORESETS associated with the linked search space sets, where the TCI states are to be applied after a time period. The node may decode a first control channel communication from one or more of the linked search space sets, the first control channel communication indicating a resource allocation for a first downlink communication to the node after the time period. The node may determine whether the one or more TCI states are applied to the first downlink communication and receive the first downlink communication based on the determined one or more TCI states.

A first network node is described. The first network node may include at least one processor and memory coupled with the at least one processor, wherein the at least one processor is configured to receive, from a second network node, first control information that indicates two or more linked search space sets, where each of the two or more linked search space sets includes an instance of a first control channel communication, and where each respective linked search space set of the two or more linked search space sets is associated with a respective CORESET, receive, from the second network node, second control information that indicates one or more TCI states of one or more CORESETs associated with the two or more linked search space sets, where the one or more TCI states are used for at least a subset of communications between the first network node and the second network node after a period of time, decode at least one instance of the first control channel communication from at least one of the two or more linked search space sets, the first control channel communication indicating a resource allocation for a first downlink communication, determine, based on the second control information, whether a first TCI state of the one or more TCI states, or a second TCI state that is different than the one or more TCI states, is used for the first downlink communication, and receive, from the second network node, the first downlink communication based on the determining.

A method is described. The method may include receiving, at a first network node from a second network node, first control information that indicates two or more linked search space sets, where each of the two or more linked search space sets includes an instance of a first control channel communication, and where each respective linked search space set of the two or more linked search space sets is associated with a respective CORESET, receiving, from the second network node, second control information that indicates one or more TCI states of one or more CORESETs associated with the two or more linked search space sets, where the one or more TCI states are used for at least a subset of communications between the first network node and the second network node after a period of time, decoding at least one instance of the first control channel communication from at least one of the two or more linked search space sets, the first control channel communication indicating a resource allocation for a first downlink communication, determining, based on the second control information, whether a first TCI state of the one or more TCI states, or a second TCI state that is different than the one or more TCI states, is used for the first downlink communication, and receiving, from the second network node, the first downlink communication based on the determining.

An apparatus is described. The apparatus may include means for receiving, at a first network node from a second network node, first control information that indicates two or more linked search space sets, where each of the two or more linked search space sets includes an instance of a first control channel communication, and where each respective linked search space set of the two or more linked search space sets is associated with a respective CORESET, means for receiving, from the second network node, second control information that indicates one or more TCI states of one or more CORESETs associated with the two or more linked search space sets, where the one or more TCI states are used for at least a subset of communications between the first network node and the second network node after a period of time, means for decoding at least one instance of the first control channel communication from at least one of the two or more linked search space sets, the first control channel communication indicating a resource allocation for a first downlink communication, means for determining, based on the second control information, whether a first TCI state of the one or more TCI states, or a second TCI state that is different than the one or more TCI states, is used for the first downlink communication, and means for receiving, from the second network node, the first downlink communication based on the determining.

A non-transitory computer-readable medium storing code is described. The code may include instructions executable by a processor to receive, at a first network node from a second network node, first control information that indicates two or more linked search space sets, where each of the two or more linked search space sets includes an instance of a first control channel communication, and where each respective linked search space set of the two or more linked search space sets is associated with a respective CORESET, receive, from the second network node, second control information that indicates one or more TCI states of one or more CORESETs associated with the two or more linked search space sets, where the one or more TCI states are used for at least a subset of communications between the first network node and the second network node after a period of time, decode at least one instance of the first control channel communication from at least one of the two or more linked search space sets, the first control channel communication indicating a resource allocation for a first downlink communication, determine, based on the second control information, whether a first TCI state of the one or more TCI states, or a second TCI state that is different than the one or more TCI states, is used for the first downlink communication, and receive, from the second network node, the first downlink communication based on the determining.

In some examples of the first network node, method, apparatus, and non-transitory computer-readable medium described herein, the determination may include a determination that the first downlink communication has the first TCI state based on a reference CORESET that is associated with the two or more linked search space sets having the first TCI state. In some examples of the first network node, method, apparatus, and non-transitory computer-readable medium described herein, the first control information includes information indicative of a monitoring occasion and an associated CORESET for each search space set of the two or more linked search space sets, where each respective CORESET has an associated TCI state.

Some examples of the first network node, method, apparatus and non-transitory computer-readable medium described herein may further include features, operations, means, or instructions to determine that a first CORESET associated with the two or more linked search space sets is a reference CORESET based on a first CORESET identification value of the first CORESET relative to other CORESET identification values of one or more other CORESETs associated with the two or more linked search space sets. Some examples of the first network node, method, apparatus and non-transitory computer-readable medium described herein may further include features, operations, means, or instructions to determine that a first CORESET associated with the two or more linked search space sets is a reference CORESET based on an index value of an associated first search space set relative to index values of one or more other of the two or more linked search space sets. Some examples of the first network node, method, apparatus and non-transitory computer-readable medium described herein may further include features, operations, means, or instructions to determine that a first CORESET associated with the two or more linked search space sets is a reference CORESET based on a starting or ending time of an associated first search space set relative to other starting or ending times of other of the two or more linked search space sets. Some examples of the first network node, method, apparatus and non-transitory computer-readable medium described herein may further include features, operations, means, or instructions to determine that a first CORESET associated with the two or more linked search space sets is a reference CORESET based on a CORESET type of each of two or more CORESETs associated with the two or more linked search space sets.

In some examples of the first network node, method, apparatus, and non-transitory computer-readable medium described herein, the first CORESET may have a predetermined CORESET type of a set of multiple available CORESET types. In some examples of the first network node, method, apparatus, and non-transitory computer-readable medium described herein, the first CORESET may have a respective CORESET type that provides dedicated reception for the first network node. In some examples of the first network node, method, apparatus, and non-transitory computer-readable medium described herein, the first CORESET may have a respective CORESET type that provides non-dedicated reception for the first network node.

In some examples of the first network node, method, apparatus, and non-transitory computer-readable medium described herein, the first CORESET may be determined to be the reference CORESET based at on a CORESET type priority order and a first CORESET type of the first CORESET. In some examples of the first network node, method, apparatus, and non-transitory computer-readable medium described herein, a TCI state of a reference CORESET may be used for reception of the first downlink communication, and where the reference CORESET is determined based on a CORESET type of the reference CORESET. In some examples of the first network node, method, apparatus, and non-transitory computer-readable medium described herein, each CORESET associated with each of the two or more linked search space sets may have a same CORESET type that corresponds to the reference CORESET.

In some examples of the first network node, method, apparatus, and non-transitory computer-readable medium described herein, each CORESET associated with each of the two or more linked search space sets may have an associated CORESET type that is included in a subset of a set of available CORESET types, and is selectable as the reference CORESET. In some examples of the first network node, method, apparatus, and non-transitory computer-readable medium described herein, the reference CORESET may be selected based on a radio network temporary identifier associated with the first control channel communication.

A first network node described. The first network node may include at least one processor and memory coupled with the at least one processor, wherein the at least one processor is configured to transmit, to a second network node, first control signaling that indicates two or more linked search space sets, where each of the two or more linked search space sets includes an instance of a first control channel communication, and where each respective linked search space set of the two or more linked search space sets is associated with a respective CORESET, transmit, to the second network node, second control information that indicates one or more TCI states of one or more CORESETs associated with the two or more linked search space sets, where the one or more TCI states are used for at least a subset of communications between the first network node and the second network node after a period of time, determine to use a first TCI state of the one or more TCI states for a first downlink communication from the first network node to the second network node, transmit a first instance of the first control channel communication in a first search space set of the two or more linked search space sets, and a second instance of the first control channel communication in a second search space set of the two or more linked search space sets, the first control channel communication indicating a resource allocation for the first downlink communication, and transmit the first downlink communication using the first TCI state.

A method is described. The method may include transmitting, from a first network node to a second network node, first control signaling that indicates two or more linked search space sets, where each of the two or more linked search space sets includes an instance of a first control channel communication, and where each respective linked search space set of the two or more linked search space sets is associated with a respective CORESET, transmitting, to the second network node, second control information that indicates one or more TCI states of one or more CORESETs associated with the two or more linked search space sets, where the one or more TCI states are used for at least a subset of communications between the first network node and the second network node after a period of time, determining to use a first TCI state of the one or more TCI states for a first downlink communication from the first network node to the second network node, transmitting a first instance of the first control channel communication in a first search space set of the two or more linked search space sets, and a second instance of the first control channel communication in a second search space set of the two or more linked search space sets, the first control channel communication indicating a resource allocation for the first downlink communication, and transmitting the first downlink communication using the first TCI state.

An apparatus is described. The apparatus may include means for transmitting, from a first network node to a second network node, first control signaling that indicates two or more linked search space sets, where each of the two or more linked search space sets includes an instance of a first control channel communication, and where each respective linked search space set of the two or more linked search space sets is associated with a respective CORESET, means for transmitting, to the second network node, second control information that indicates one or more TCI states of one or more CORESETs associated with the two or more linked search space sets, where the one or more TCI states are used for at least a subset of communications between the first network node and the second network node after a period of time, means for determining to use a first TCI state of the one or more TCI states for a first downlink communication from the first network node to the second network node, means for transmitting a first instance of the first control channel communication in a first search space set of the two or more linked search space sets, and a second instance of the first control channel communication in a second search space set of the two or more linked search space sets, the first control channel communication indicating a resource allocation for the first downlink communication, and means for transmitting the first downlink communication using the first TCI state.

A non-transitory computer-readable medium storing code is described. The code may include instructions executable by a processor to transmit, from a first network node to a second network node, first control signaling that indicates two or more linked search space sets, where each of the two or more linked search space sets includes an instance of a first control channel communication, and where each respective linked search space set of the two or more linked search space sets is associated with a respective CORESET, transmit, to the second network node, second control information that indicates one or more TCI states of one or more CORESETs associated with the two or more linked search space sets, where the one or more TCI states are used for at least a subset of communications between the first network node and the second network node after a period of time, determine to use a first TCI state of the one or more TCI states for a first downlink communication from the first network node to the second network node, transmit a first instance of the first control channel communication in a first search space set of the two or more linked search space sets, and a second instance of the first control channel communication in a second search space set of the two or more linked search space sets, the first control channel communication indicating a resource allocation for the first downlink communication, and transmit the first downlink communication using the first TCI state.

In some examples of the first network node, method, apparatus, and non-transitory computer-readable medium described herein, the first TCI state may be applied to the first downlink communication based on a reference CORESET that is associated with the two or more linked search space sets having the first TCI state. In some examples of the first network node, method, apparatus, and non-transitory computer-readable medium described herein, the first control information includes information indicative of a monitoring occasion and an associated CORESET for each search space set of the two or more linked search space sets, where each respective CORESET has an associated transmission configuration indicator state.

Some examples of the first network node, method, apparatus and non-transitory computer-readable medium described herein may further include features, operations, means, or instructions to determine that a first CORESET associated with the two or more linked search space sets is a reference CORESET based on a first CORESET identification value of the first CORESET relative to other CORESET identification values of one or more other CORESETs associated with the two or more linked search space sets. Some examples of the first network node, method, apparatus and non-transitory computer-readable medium described herein may further include features, operations, means, or instructions to determine that a first CORESET associated with the two or more linked search space sets is a reference CORESET based on a CORESET type of each of two or more CORESETs associated with the two or more linked search space sets.

Some examples of the first network node, method, apparatus and non-transitory computer-readable medium described herein may further include features, operations, means, or instructions to determine that a first CORESET associated with the two or more linked search space sets is a reference CORESET based on an index value of an associated first search space set relative to index values of one or more other of the two or more linked search space sets. In some examples of the first network node, method, apparatus, and non-transitory computer-readable medium described herein, the first CORESET is selected as the reference control resource set based on one or more of a predetermined first CORESET type of a set of multiple available CORESET types, an associated CORESET type that provides dedicated reception for the second network node, an associated CORESET type that provides non-dedicated reception for the second network node, or a CORESET type priority order.

Some examples of the first network node, method, apparatus and non-transitory computer-readable medium described herein may further include features, operations, means, or instructions to select a first CORESET of the one or more CORESETs as a reference CORESET based on a starting or ending time of an associated first search space set relative to other starting or ending times of other of the two or more linked search space sets. In some examples of the first network node, method, apparatus, and non-transitory computer-readable medium described herein, the TCI state of a reference CORESET may be used for transmission of the first downlink communication, and where the reference CORESET is determined based on a CORESET type of the reference CORESET.

DETAILED DESCRIPTION

Figure 1:
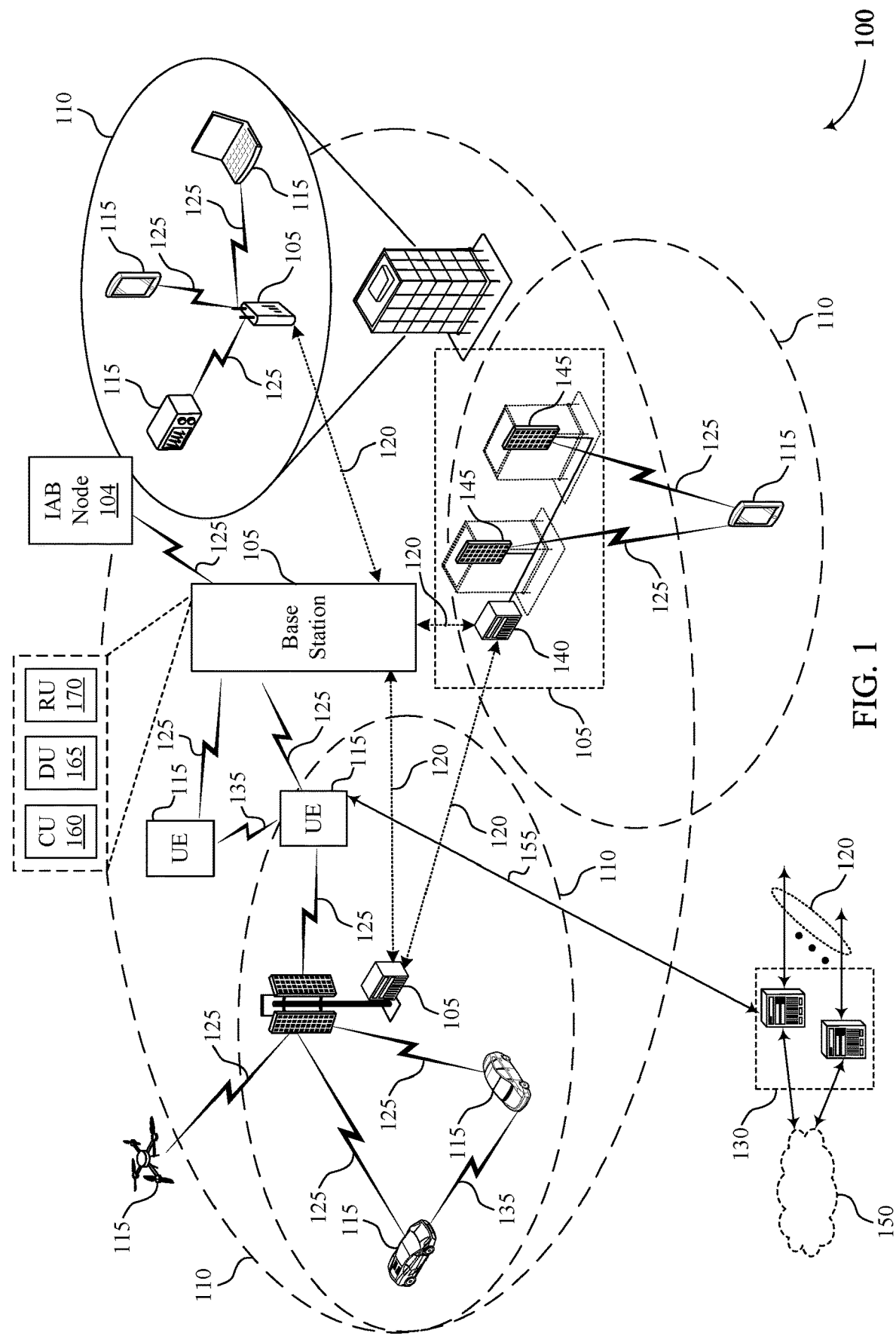
FIG. 1 illustrates an example of a wireless communications system that supports transmission configuration indicator (TCI) state determination based on multiple control channel repetitions in accordance with aspects of the present disclosure.

Implementations described herein provide techniques for identifying one or more activated transmission configuration indicator (TCI) states for communications between network nodes (e.g., one or more transmission reception points (TRPs) and a user equipment (UE)). In some cases, codepoints may be configured at a UE (which may be an example of a network node) and a particular codepoint may be indicated to the UE (e.g., in a medium access control (MAC) control element (CE)) and one or more associated TCIs may be used for communications starting after a period of time (e.g., in the first slot that is at least Y symbols after a last symbol of an acknowledgment of codepoint receipt) until a subsequent different codepoint is indicated to the UE (e.g., an indication of a TCI codepoint is a "sticky" indication that is used for communications until changed). Such configuration and activation of codepoints in some cases may be referred to as unified TCI. In some cases, each codepoint may include one or two TCI states, and each respective TCI state identifier in the codepoint may correspond to a TCI state type, such as uplink, downlink, or both. For example, one TCI state or multiple TCI states may be mapped to a single TCI codepoint, where the single TCI codepoint also indicates respective TCI state types for the activated TCI states. In some implementations, another node (e.g., a base station or other network entity) may configure two separate TCI state lists, one for downlink TCI states and one for uplink TCI states. Each codepoint may include one or multiple TCI state identifiers, and an indication of one of the two configured lists with which the TCI state identifier is associated.

In some cases, downlink communications (e.g., physical downlink control channel (PDCCH) transmissions, physical downlink shared channel (PDSCH) transmissions, or both) may use a beam that is indicated to be applied with unified TCI, where one or more indicated TCI states are applied to UE-dedicated PDCCH and respective scheduled PDSCH communications. For non-UE-dedicated PDCCH and respective PDSCH, a UE may be provided with configuration information that indicates whether the UE is to apply the unified TCI indication or not. In cases where the UE does not apply the unified TCI indication, the TCI for PDSCH may be indicated in a TCI field in control information that schedules the PDSCH, and the TCI for PDCCH may be determined based on a control resource set (CORESET) that is associated with a search space that is monitored for the PDCCH transmission. Whether a PDCCH is a UE dedicated or a non-UE-dedicated control channel transmission may be defined with respect to the CORESET and associated search space sets (e.g., UE-specific search space (USS) and common search space (CSS) Type3 may be considered as UE-dedicated, and CSS Type 0/0A/1/2 may be considered as non-UE-dedicated). Further, the beam of PDSCH (e.g., whether to apply the unified TCI beam indication or not) may be based on the CORESET type (A/B/C/#0) in which the scheduling DCI is received.

In some cases, multiple instances or repetitions of downlink control channel transmissions (e.g., PDCCH transmissions) may be transmitted, where each instance is transmitted in a PDCCH candidate, and two or more PDCCH candidates are linked together for repetition of the same control information. In such cases, the multiple PDCCH candidates may have a same aggregation level (e.g., a same number of CCEs), and the control information payload transmitted using the two PDCCH candidates may be the same, which may allow a receiving UE to perform soft combining to decode the control information or try to individually decode different PDCCH candidates. The multiple PDCCH candidates may be configured as linked control channel candidates (e.g., via radio resource control (RRC) signaling), such that the UE is aware of the linked candidates prior to attempting to decode each candidate. In some cases, each search space (SS) set may have an associated monitoring occasion (MO), and the MOs of the linked SS sets may be one-to-one mapped. Further, downlink control channel candidates of the linked SS sets may have a same aggregation level (AL), a same candidate index, and a same number of candidates for each AL.

In cases where linked SS sets are configured for downlink control channel repetitions, one or more procedures may be based on a reference control channel candidate. For example, a timeline for an associated shared channel transmission or acknowledgment transmission, PUCCH resource determination, or rate matching, may be based on the reference control channel candidate among the multiple candidates in the linked SS sets. Such a reference control channel candidate may thus avoid ambiguity between the UE and base station as to which of the two instances, or both, are decoded. However, if a shared channel (e.g., PDSCH) communication is scheduled by control information provided in the linked SS sets, a first linked SS set may be associated with a first CORESET of a first CORESET Type (e.g., among CORESET Types A/B/C or CORESET #0), and a second SS set may be associated with a second CORESET of a different CORESET Type. Various aspects as discussed herein provide for the determination of the TCI state of a scheduled communication provided in the associated control information (e.g., the TCI state of a PDSCH communication that is scheduled by the control information) in cases where linked SS sets are configured. In some cases, techniques provide for determination of whether to apply a unified TCI beam indication to the scheduled communication or not, which could otherwise be ambiguous if the two different CORESET Types follow different rules (e.g., do not have the same TCI state) as a UE may detect the control information in only one of the linked candidates or in both linked candidates.

In accordance with various aspects, techniques described herein provide that, for linked SS sets that provide downlink control channel (e.g., PDCCH) repetition, the TCI state for a downlink transmission scheduled by the PDCCH may be determined based on a reference CORESET that is associated with the different SS sets. In some cases, the reference CORESET may be based on a CORESET with lower or higher CORESET identification, a CORESET that is associated with the lower or higher SS set index among the linked SS sets, a CORESET associated with the PDCCH candidates that starts or ends later or earlier in time among the linked candidates, or based on comparing the CORESET Type of the associated CORESETs. In some cases, if the reference CORESET is associated with UE-dedicated reception, then unified TCI may be applied to the downlink transmission, and if the reference CORESET is associated with non-UE-dedicated reception then unified TCI may be applied based on UE configuration (e.g., RRC configuration). In some cases, the CORESETs used for linked SS sets may be constrained to be of the same type, and thus no ambiguity is present from different types of CORESETs associated with different SS sets of linked SS sets. In some cases, the reference CORESET may be determined based on a radio network temporary identification (RNTI) in the SS sets (e.g., CRNTI, MCS-CRNTI, CS-RNTI may be considered UE-dedicated; and other RNTIs may be considered non-UE dedicated).

Particular implementations of the subject matter described in this disclosure can be implemented to realize one or more of the following potential advantages. For example, enhanced reliability for control channel communications may be achieved, while providing a receiving node an indication of a TCI state associated with an associated scheduled communication. Further, by indicating the TCI state types corresponding to the CORESET of a linked SS set, signaling overhead may be reduced. Additionally, described techniques may support increased flexibility for nodes, due to activation of more TCI states of different types (such as, joint or separate TCI states) without a corresponding increase in signaling. This may result in more efficient use of spatial resources, as well as decreased collisions and interference, without introducing signaling delays and increased system latency. Thus, described techniques may result increased reliability of communications and improved user experience. Further, described techniques may support flexible and efficient indications of TCI states supporting mTRP communications, resulting in more efficient and reliable communications and decreased signaling overhead.

Aspects of the disclosure are initially described in the context of wireless communications systems. Aspects of the disclosure are further illustrated by and described with reference to TCI state indications and timing, linked SS sets and associated TCI states, process flows, apparatus diagrams, system diagrams, and flowcharts that relate to TCI state determination based on multiple control channel repetitions.

FIG. 1 illustrates an example of a wireless communications system 100 that supports TCI state determination based on multiple control channel repetitions in accordance with aspects of the present disclosure. The wireless communications system 100 may include multiple network nodes such as one or more base stations 105 and one or more UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some aspects, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some aspects, one or more components of the wireless communications system 100 may, separately or jointly, operate as or be referred to as a node or network node. As used herein, a node or a network node may refer to any UE 115, base station 105, entity of a core network 130, network controller, apparatus, device, computing system, one or more components, and/or another suitable processing entity configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different relative to these examples. Similarly, reference to a UE 115, a base station 105, an apparatus, a device, a computing system, or the like may include disclosure of the UE 115, base station 105, apparatus, device, computing system, or the like being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, a first computing system, or the like configured to receive the information; and the second network node may refer to a second UE 115, a second base station 105, a second apparatus, a second device, a second computing system, or the like.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some aspects (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some aspects the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some aspects, the wireless communications system 100 may include base stations 105 or UEs 115 that support simultaneous communications via carriers associated with multiple carrier bandwidths. In some aspects, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some aspects, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In other aspects, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some aspects, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some aspects, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may also be able to communicate directly with other UEs 115 over a device-to-device (D2D) communication link 135 (e.g., using a peer-to-peer (P2P) or D2D protocol). The communication link 135 may be or may include a sidelink. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the base stations 105, and EHF antennas of the respective devices may be smaller and more closely spaced than UHF antennas. In some aspects, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some aspects, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some aspects, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some aspects, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a base station 105 may additionally or alternatively be performed by components of the disaggregated RAN architecture (e.g., IAB nodes, DUs, CUs, etc.).

In some cases, one or more network nodes (e.g., UEs 115) may be configured with linked SS sets that provide downlink control channel (e.g., PDCCH) repetition, and a TCI state for a downlink transmission scheduled by the control channel repetitions may be determined based on a CORESET of one or more of the different SS sets. In some cases, a reference CORESET may be used to determine the TCI state of the scheduled communication, and the reference CORESET may be based on a CORESET with lower or higher CORESET identification, a CORESET that is associated with the lower or higher SS set index among the linked SS sets, a CORESET associated with the PDCCH candidates that starts or ends later or earlier in time among the linked candidates, or based on comparing the CORESET Type of the associated CORESETs. In some cases, if the reference CORESET is associated with UE-dedicated reception, then unified TCI may be applied to the downlink transmission, and if the reference CORESET is associated with non-UE-dedicated reception then unified TCI may be applied based on node configuration (e.g., RRC configuration). In some cases, the CORESETs used for linked SS sets may be constrained to be of the same CORESET Type, and thus no ambiguity is present from different types of CORESETs associated with different SS sets of linked SS sets. In some cases, the reference CORESET may be determined based on a RNTI in the SS sets.

Figure 2:
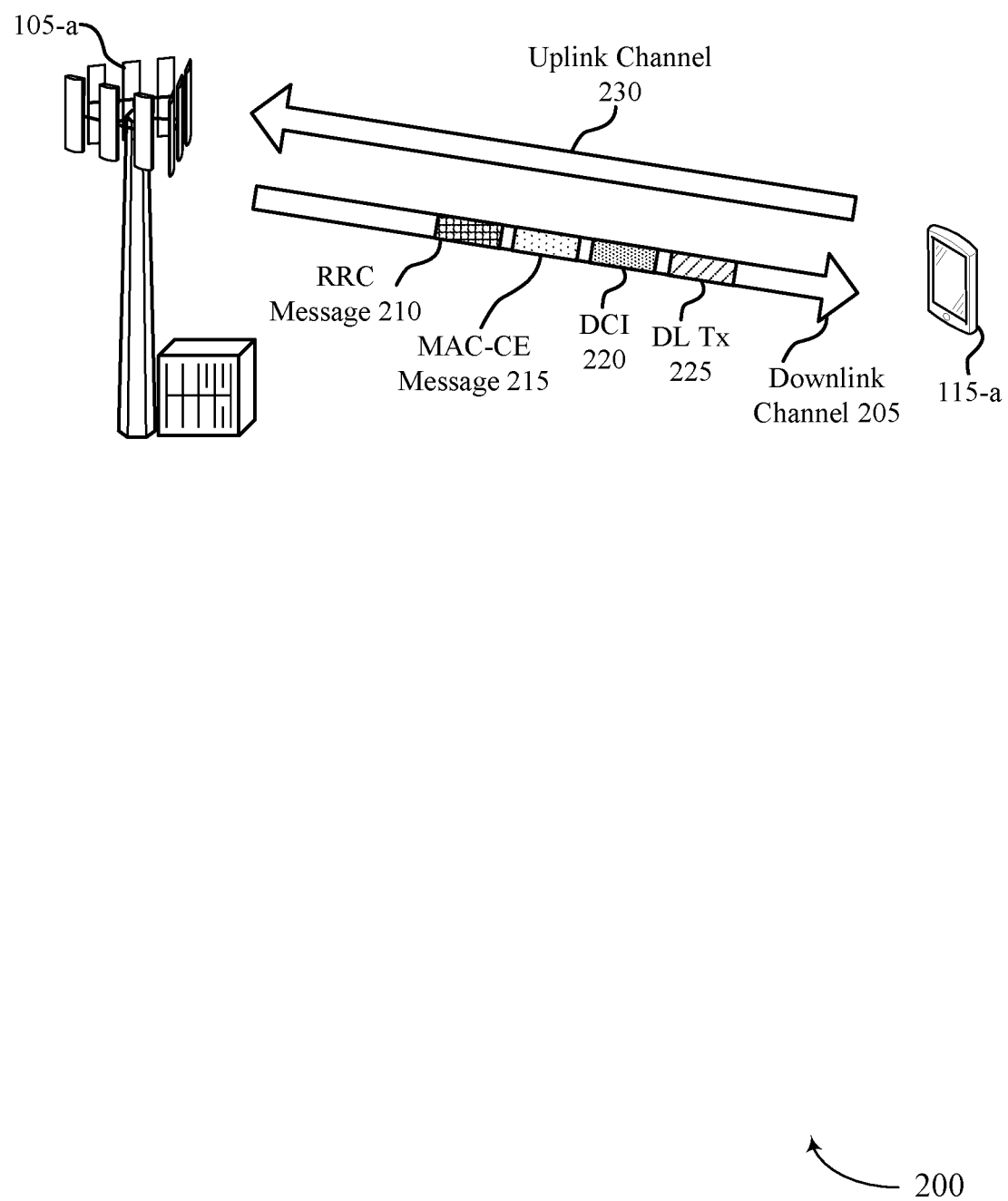
FIG. 2 illustrates an example of a wireless communications system that supports TCI state determination based on multiple control channel repetitions in accordance with aspects of the present disclosure.

FIG. 2 illustrates an example of a wireless communications system 200 that supports TCI state determination based on multiple control channel repetitions in accordance with aspects of the present disclosure. The wireless communications system 200 may be an example of the wireless communications system 100. For example, the wireless communications system 200 may include nodes such as a UE 115-a and a base station 105-a, which may be examples of nodes as described with reference to FIG. 1. While aspects are discussed herein with reference to UEs 115 and base stations 105, any number of devices and device types may be used to accomplish implementations described in the present disclosure. As used herein, the term beam configuration may be referred to as a TCI state, and the term TCI state may be referred to as a beam configuration.

The base station 105-a and the UE 115-a may communicate via a downlink channel 205 and an uplink channel 230. In some wireless communications systems, such as 5G or NR, different types of TCI states may be used to improve channel utilization between wireless devices. For example, a wireless communications system may support joint TCI states for both downlink and uplink signaling using a unified TCI framework. In some systems, wireless communications systems may support PDCCH repetitions in which multiple instances of scheduling control information (e.g., a scheduling DCI) may be provided in linked SS sets. In some cases, when linked SS sets are configured with PDCCH repetitions, a TCI state associated with the scheduled communications may be identified based on one or more CORESETs associated with the linked SS sets.

In some implementations, the UE 115-a may receive a configuration of TCI states from the base station 105-a, such as in one or more RRC messages 210 via RRC signaling. Further, in some cases one or more RRC messages 210 may include configuration information for linked SS sets and PDCCH repetition. The UE 115-a may receive a MAC-CE message 215 from the base station 105-a associated with the configuration of TCI states, where the MAC-CE message 215 may activate a subset of configured TCI states along with a mapping to TCI codepoints. In accordance with various aspects discussed herein, control information such as DCI 220 may indicate a particular TCI state codepoint for unified TCI is selected for use in communications with the base station 105-a, where the TCI codepoint indicates a particular TCI state or two or more particular TCI states from the subset of activated TCI states. In some cases, when multiple SS sets are linked (e.g., by RRC configuration) for PDCCH repetition associated with multiple corresponding CORESETs, and a PDCCH that is associated with the linked SS sets (e.g., linked PDCCH candidates in the SS sets) schedules a downlink transmission 225 (e.g. a PDSCH), the UE 115-a and base station 105-a may determine whether the unified TCI beam indication associated with the TCI codepoint is applied to the PDSCH or not based on one or more CORESETs associated with the linked SS sets.

In some cases, the determination of whether the unified TCI beam indication associated with the TCI codepoint is applied to the downlink transmission 225 is based on a reference CORESET of the multiple CORESETs associated with the linked SS sets. For example, the reference CORESET may be based on a CORESET having a higher or lower CORESET identification, based on a CORESET that is associated with a higher or lower SS set among the linked SS sets, a CORESET associated with PDCCH candidate start or end times (e.g., a PDCCH candidate with an earlier or later start or end time indicates the reference CORESET), or a CORESET Type of the multiple CORESETs. In cases where the CORESET Type is used to determine the reference CORESET, the determination may be that, for example, if one of the CORESETs is CORESET #0, it may be considered as reference; if one of the CORESETs is only associated with USS or CSS Type 3 (e.g., UE-dedicated reception, TypeA), it may be considered as reference; if one of the CORESETs is only associated with CSS Type 0/0A/1/2 (e.g., non-UE-dedicated reception, TypeB), it may considered as reference; or a fixed priority among different CORESET Types (e.g., CORESET #0>TypeB>TypeC>TypeA, where TypeC corresponds to CORESET other than CORESET #0 associated with both UE-dedicated and non-UE-dedicated reception on PDCCH). In some cases, the CORESET Type of each CORESET associated with linked SS sets may be constrained to be the same CORESET Type, and whether unified TCI beam indication is applied is based on the single CORESET Type.

In some aspects, the UE 115-a may be an example of a first network node, and may perform monitoring a first SS set for a first instance of a first control channel communication, monitoring a second SS set for a second instance of the first control channel communication, wherein the first SS set and the second SS set are linked, and determining whether a first TCI state of one or more TCI states, or a second TCI state that is different than the one or more TCI states, is used for a first downlink communication that is scheduled by the first control channel communication. In some aspects, the first TCI state may be determined for the first downlink communication based on a reference CORESET that is associated with the first SS set or the second SS set.

Figure 3:
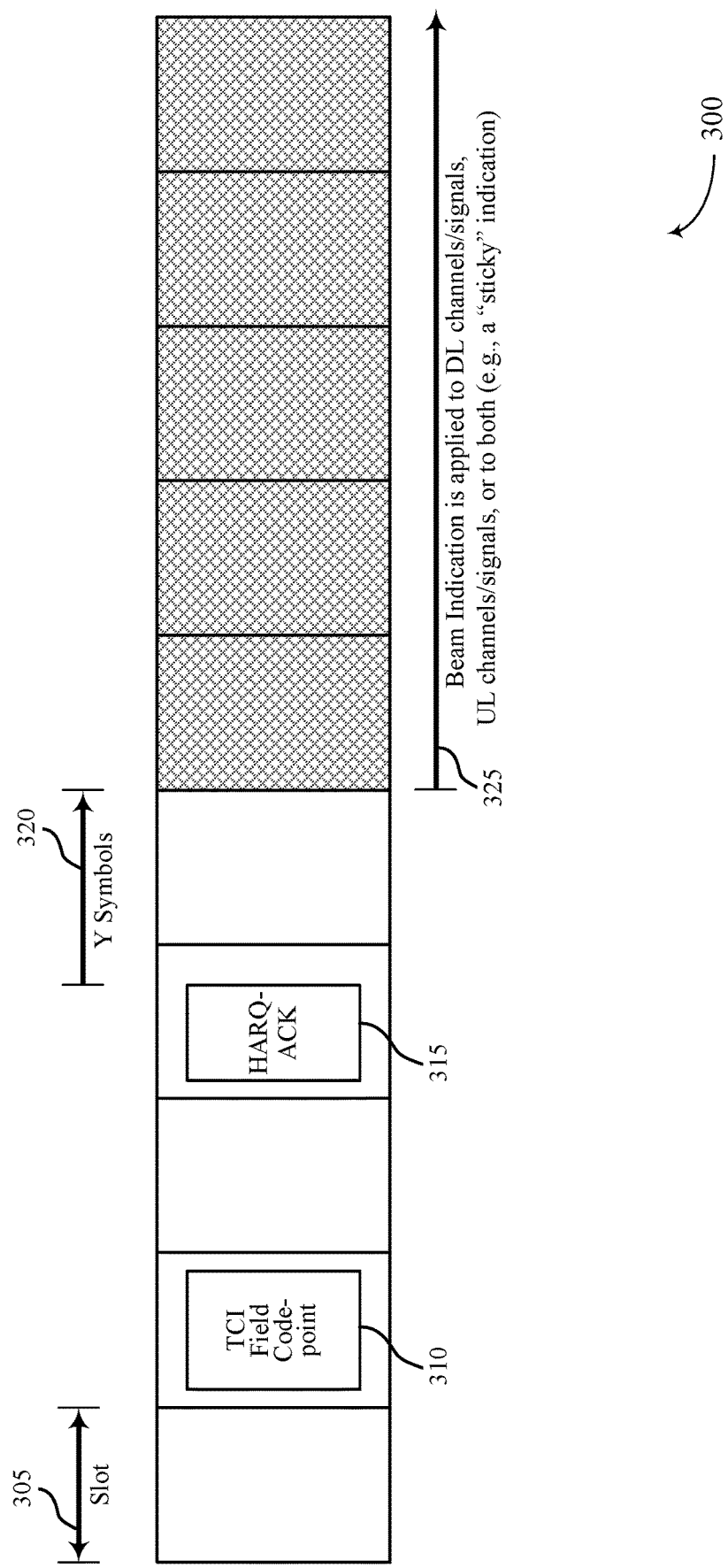
FIG. 3 illustrates an example of a TCI state indication that supports TCI state determination based on multiple control channel repetitions in accordance with aspects of the present disclosure.

FIG. 3 illustrates an example of a TCI state indication 300 that supports TCI state determination based on multiple control channel repetitions in accordance with aspects of the present disclosure. The TCI state indication 300 may be implemented by one or more aspects of the wireless communications systems 100 or 200. For example, the TCI state indication 300 may be utilized by one or more nodes (e.g., base stations or TRPs associated with a base station, and a UE), which may be examples of corresponding devices as described with reference to FIGS. 1 and 2.

In the example of FIG. 3, a UE and TRP may communicate in slots 305, in which one of the slots 305 may include a beam indication DCI that indicates a TCI field codepoint 310 (e.g., from two or more mapped TCI codepoints provided by a MAC-CE). As discussed herein, the TCI field codepoint 310 may be mapped to one or multiple TCI states (e.g., one or more uplink TCI states, one or more downlink TCI states, one or more joint DL/UL TCI states, or any combinations thereof). For example, one TCI field codepoint 310 may represent one or more joint downlink/uplink TCI state, which may be used for joint downlink/uplink beam indication. In another example, one TCI field codepoint 310 may represent one or more pairs with a downlink TCI state and uplink TCI state, which may be used for separate downlink/uplink beam indication. In other aspects, one TCI field codepoint 310 may represent only one or more downlink TCI states, which may be used for downlink beam indication, or one TCI field codepoint 310 may represent only one or more uplink TCI states, which may be used for uplink beam indication. In some cases, if the MAC-CE indicates the mapping to only a single TCI field codepoint, it may serve as a beam indication, and a separate beam indication in an activation DCI may not be needed.

A UE that receives the DCI with the TCI field codepoint 310 may transmit a feedback indication, such as a HARQ-acknowledgment 315, to a base station or TRP that indicates successful receipt of the DCI. In some cases, the beam indication provided in the TCI field codepoint 310 may be applied to communications starting a time period 320 (e.g., Y symbols) after the HARQ-acknowledgment 315 (e.g., which may be an example of a period of time at which to apply the TCI state(s)). For example, the beam indication may be applied three milliseconds after HARQ-acknowledgment 315, as indicated at 325 in the example of FIG. 3. In some cases, the time period 320 may be applied in the first slot that is at least Y symbols (e.g., which is RRC-configured based on UE capability) after the last symbol of a control channel transmission (e.g., a physical uplink control channel (PUCCH) transmission) carrying the HARQ-acknowledgment 315. In some cases, the Y symbols may be consecutive or non-consecutive. For example, two or more symbols of the Y symbols may be consecutive. As another example, two or more symbols of the Y symbols may be non-consecutive (e.g., the Y symbols count only uplink symbols or only downlink symbols). As another example, two or more symbols of the Y symbols may be consecutive and two or more symbols of the Y symbols may be non-consecutive. In some cases, the beam indication may be a "sticky" indication in that it is not related to the scheduled shared channel communication (e.g., a physical downlink shared channel (PDSCH) transmission), and it is not a one-time indication. When the beam indication is applied, it remains the same for the applicable channels/signals until changed (e.g., another MAC-CE or DCI format 1_1/1_2 changes the beam). In some cases, the beam indication may be common for multiple downlink channels/signals (e.g., PDSCH, PDCCH, CSI-RS) and/or multiple uplink channels/signals (PUSCH, PUCCH, SRS). Further, the beam indication may be based on a CORESET that is associated with a PDCCH candidate that provides scheduling information.

As discussed herein, in cases where linked SS sets are used to provide multiple instances of control information that includes scheduling information, different CORESETs may be associated with different instances of the control information (e.g., different PDCCH candidates may be associated with search spaces of different CORESETs). In some cases, the determination of whether the unified TCI beam indication associated with the TCI codepoint is applied to the scheduled communication is based on a reference CORESET of the multiple CORESETs associated with the linked SS sets. Examples of linked SS sets and TCI state indications are discussed with reference to FIGS. 4 through 6.

Figure 4:
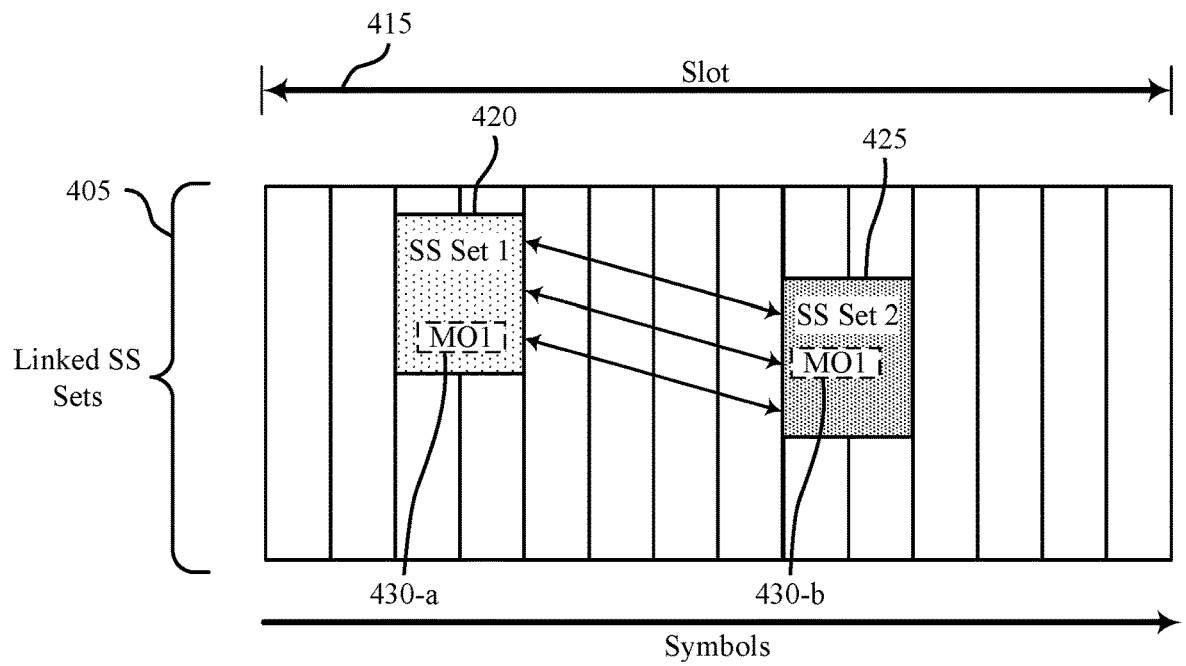
FIG. 4 illustrates examples of linked search space sets that support TCI state determination based on multiple control channel repetitions in accordance with aspects of the present disclosure.
Figure 4:
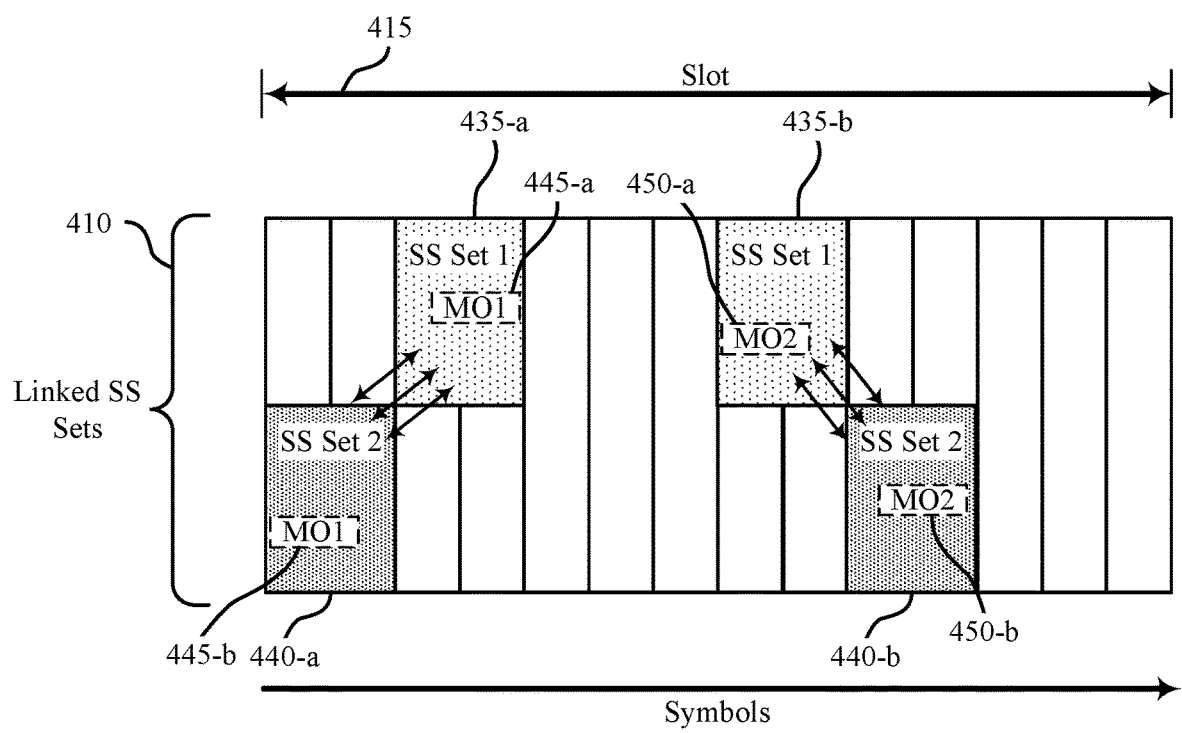

FIG. 4 illustrates examples of linked SS sets 400 that support TCI state determination based on multiple control channel repetitions in accordance with aspects of the present disclosure. The linked SS sets 400 may be implemented by one or more aspects of the wireless communications systems 100 or 200. For example, the linked SS sets 400 may be utilized by one or more nodes (e.g., base stations or TRPs associated with a base station, and one or more UEs), which may be examples of corresponding devices as described with reference to FIGS. 1 and 2.

In a first example 405 of linked SS sets, a slot 415 may include a number of OFDM symbols that include resources for a first SS set 420 and a second SS set 425. In this first example 405, a single monitoring occasion 430 (MO1) is illustrated for each of the first SS set 420 and the second SS set 425 which contain instances of the single monitoring occasion 430-a and 430-b, respectively. In some cases, RRC signaling may configure the first SS set 420 and the second SS set 425 as linked SS sets for PDCCH repetitions. In a second example 410 of linked SS sets, the slot 415 may include resources for two monitoring occasions 445 and 450 of a first SS set 435 and a second SS set 440. Thus, in this example, a first instance of first monitoring occasion 445-a of the first SS set 435-a may be linked with a second instance of the first monitoring occasion 445-b of the second SS set 440-a, and a first instance of second monitoring occasion 450-a of the first SS set 435-b may be linked with a second instance of the second monitoring occasion 450-b of the second SS set 440-b.

In some cases, the monitoring occasions of the SS sets may provide decoding candidates for PDCCH repetitions, and each PDCCH repetition may be a PDCCH candidate, such that two (or more) PDCCH candidates may be linked together for repetition of the same DCI. In some cases, the PDCCH candidates may have the same AL (e.g., a same number of control channel elements (CCEs)), and the DCI payload transmitted using the two PDCCH candidates may be the same, which allows a receiving UE to perform soft combining to decode the DCI. The receiving UE may also try to individually decode the two candidates. As discussed herein, in some cases a TCI state of a PDSCH transmission that is scheduled by the PDCCH may be based on a CORESET associated with the PDCCH candidate that carries the DCI. Further, in cases where linked SS sets are used to provide multiple instances of control information that includes scheduling information, different CORESETs may be associated with different instances of the control information (e.g., first SS set 420 and second SS set 425 may be associated with different CORESETs, and first SS set 435 and second SS set 440 may be associated with different CORESETs). In some cases, the determination of whether the unified TCI beam indication associated with a configured TCI codepoint is applied to the scheduled communication is based on a reference CORESET of the multiple CORESETs associated with the linked SS sets.

Figure 5:
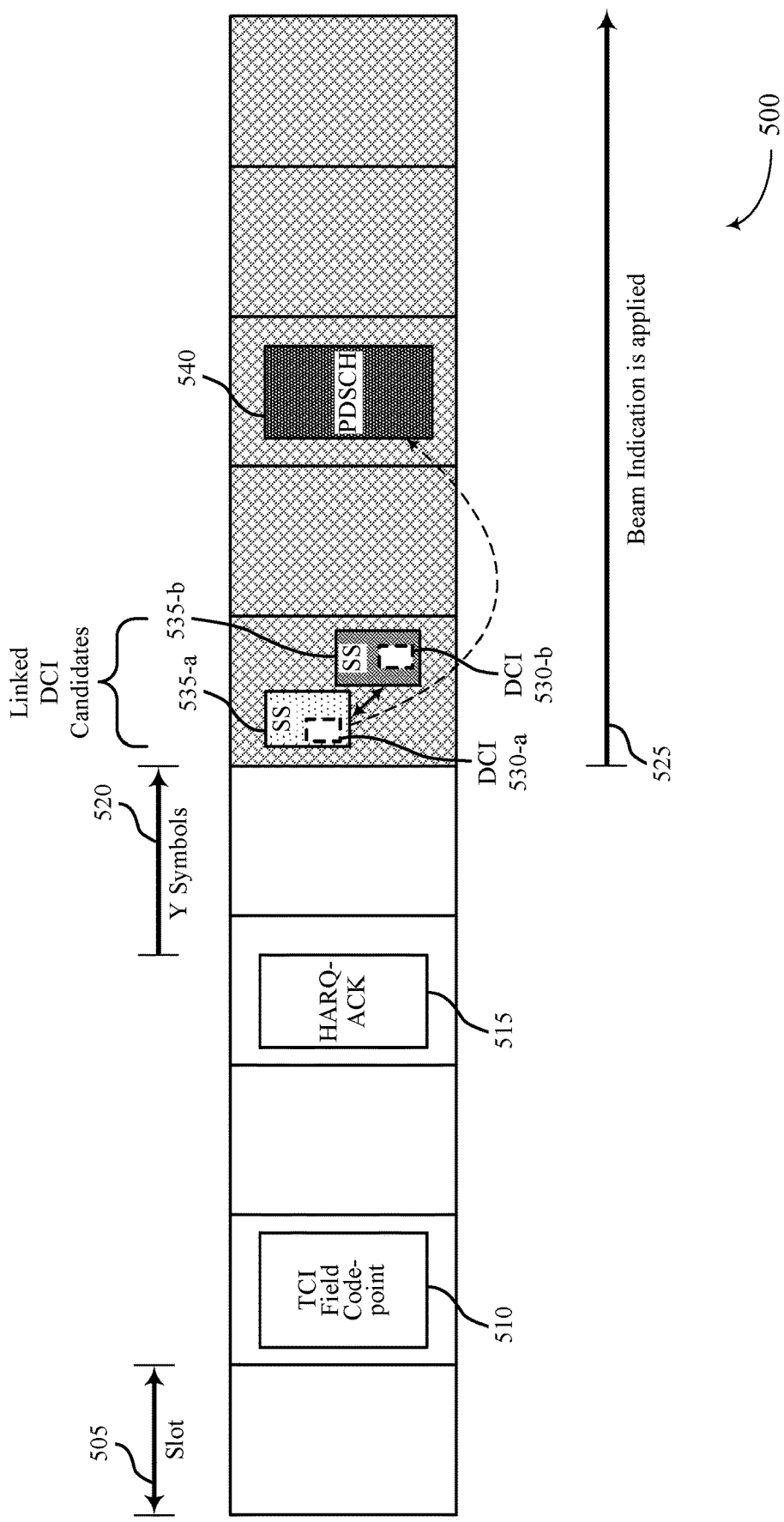
FIG. 5 illustrates an example of a TCI state indication based on linked search space sets that supports TCI state determination based on multiple control channel repetitions in accordance with aspects of the present disclosure.

FIG. 5 illustrates an example of a TCI state indication based on linked SS sets 500 that supports TCI state determination based on multiple control channel repetitions in accordance with aspects of the present disclosure. The TCI state indication based on linked SS sets 500 may be implemented by one or more aspects of the wireless communications systems 100 or 200. For example, the TCI state indications based on linked SS sets 500 may be utilized by one or more nodes (e.g., base stations or TRPs associated with a base station, and one or more UEs), which may be examples of corresponding devices as described with reference to FIGS. 1 and 2.

In the example of FIG. 5, a base station or other network entity may transmit, and a UE may receive, a DCI with a TCI field codepoint 510, which may indicate one or more TCI states for communications in slots 505 between the UE and base station. Similarly as discussed with reference to FIG. 4, the UE may transmit a HARQ-acknowledgment 515, and may apply the beam indication at 525, starting from a first slot following a period of time 520 (e.g., Y symbols) after transmission of the HARQ-acknowledgment 515. A base station may transmit multiple instances of a scheduling DCI 530 according to a linked SS set configuration, which may include a first instance of scheduling DCI 530-a in a first search space set 535-a and a second instance of scheduling DCI 530-b in a second search space set 535-b, which each may include scheduling information for a PDSCH 540.

In this example, the TCI state or states for the PDSCH 540 may be based on a TCI state of a CORESET that is associated with a PDCCH candidate that includes the DCI 530. In accordance with techniques as discussed herein, in cases where different instances of DCI 530 are in SS sets 535 associated with different CORESETs, the TCI state of the PDSCH 540 may be based on one or more of the different CORESETS. In some cases, a reference CORESET may be identified from the different SS sets 535. In some cases, a determination of whether the unified TCI beam indication associated with the TCI field codepoint 510 is applied to the PDSCH 540 is based on the reference CORESET. For example, the reference CORESET may be based on a CORESET having a higher or lower CORESET identification, may be based on a CORESET that is associated with a higher or lower SS set among the linked SS sets, may be a CORESET associated with PDCCH candidate start or end times (e.g., a PDCCH candidate with an earlier or later start or end time indicates the reference CORESET), or may be based on a CORESET Type of the multiple CORESETs. In cases where the CORESET Type is used to determine the reference CORESET, the determination may be that, for example, if one of the CORESETs is CORESET #0, it may be considered as reference; if one of the CORESETs is only associated with USS or CSS Type 3 (e.g., UE-dedicated reception, TypeA), it may be considered as reference; if one of the CORESETs is only associated with CSS Type 0/0A/1/2 (e.g., non-UE-dedicated reception, TypeB), it may considered as reference; or a fixed priority among different CORESET Types (e.g., CORESET #0>TypeB>TypeC>TypeA). In some cases, the CORESET Type of each CORESET associated with linked SS sets may be constrained to be the same CORESET Type, and whether unified TCI beam indication is applied is based on the single CORESET Type.

In some cases, if the reference CORESET is only associated with USS or CSS Type 3 (e.g., associated with UE-dedicated reception, TypeA), the unified TCI beam indication is applied to the PDSCH 540. In some cases, if the reference CORESET is only associated with CSS Type 0/0A/1/2 (e.g., associated with non-UE-dedicated reception, TypeB), whether or not the unified TCI beam indication is applied to the PDSCH 540 may depend on an RRC configuration for the CORESET. In some cases, if the reference CORESET is associated with both USS/CSS Type 3 and CSS Type 0/0A/1/2 (e.g., both UE-dedicated and non-UE-dedicated reception, TypeC), the behavior can be same as either TypeA or TypeB. In some cases, if the reference CORESET is CORESET #0, the behavior may be same as either TypeA, TypeB, or the UE may not apply the unified TCI beam indication to the PDSCH 540.

In other cases, a base station that schedules communications and provides the DCI 530 may be restricted in the CORESET Type that can be selected for linked DCI candidates, such that the CORESET Type of each of the CORESETs is the same. For example, SS sets associated with each of the CORESETs may be associated with USS or CSS Type 3 (e.g., UE-dedicated reception, TypeA), or SS sets associated with each of the CORESETs may be associated with CSS Type 0/0A/1/2 (e.g., non-UE-dedicated reception, TypeB), or SS sets associated with each of the CORESETs may be associated with both USS/CSS Type 3 and CSS Type 0/0A/1/2 (e.g., both UE-dedicated and non-UE-dedicated reception, TypeC), or each may be CORESET #0 (or more generally, the CORESETs have the same ID, and are the same CORESET). With such a restriction, there is no ambiguity between CORESETs, and whether the unified TCI beam indication is applied to the PDSCH or not depends only on the Type of CORESET of the linked SS sets. In some cases, the CORESET Type may be identified based on RNTIs in the SS sets associated with that CORESET (e.g., instead of being based on SS set Type: USS, CSS Type 3, CSS Type 0/0A/1/2 as discussed herein). For example, CRNTI, MCS-CRNTI, CS-RNTI, as used in 5G communications, may be considered UE-dedicated, and other RNTIs (e.g., other RNTIs used in 5G communications such as SI-RNTI, RA-RNTI, MsgB-RNTI, TC-RNTI, P-RNTI, INT-RNTI, SFI-RNTI, TPC-PUSCH-RNTI, TPC-PUCCH-RNTI, TPC-SRS-RNTI, or CI-RNTI) may be considered non-UE dedicated.

Figure 6:
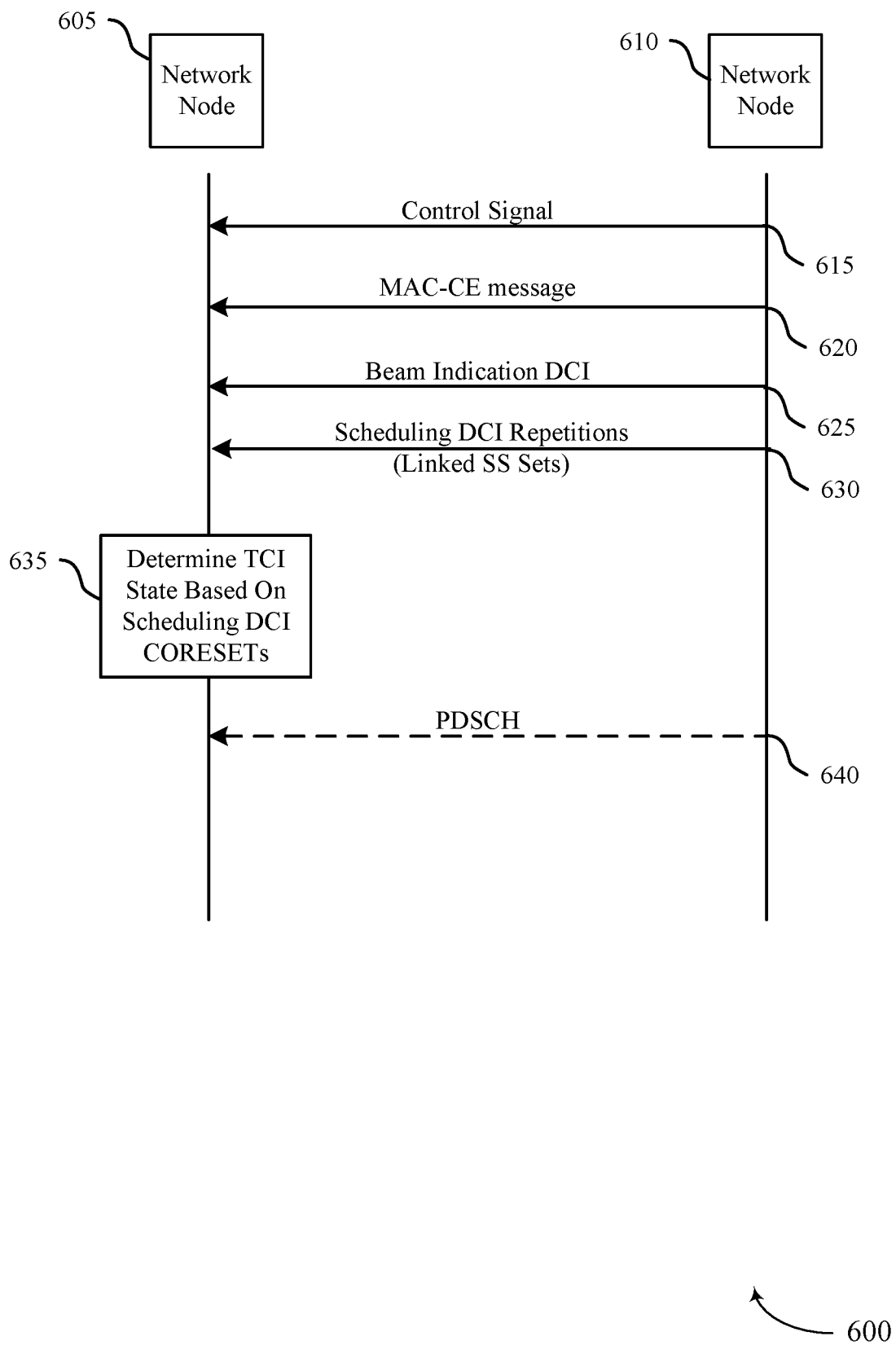
FIG. 6 illustrates an example of a process flow that supports TCI state determination based on multiple control channel repetitions in accordance with aspects of the present disclosure.

FIG. 6 illustrates an example of a process flow 600 that supports TCI state determination based on multiple control channel repetitions in accordance with aspects of the present disclosure. The process flow may be implemented by devices in a wireless communications system as discussed herein. For example, the process flow 600 may include a first network node 605 and a second network node 610, which may be examples of network nodes as discussed with reference to FIGS. 1 and 2. In the following description of the process flow 600, operations between the first network node 605 and the second network node 610, may occur in a different order or at different times than as shown. Some operations also may be omitted from the process flow 600, and other operations may be added to the process flow 600.

At 615, the second network node 610 may transmit a control signal to the first network node 605. For example, the second network node 610 may transmit an RRC message to the first network node 605 indicating a set of available beam configurations TCI states, or multiple lists of beam configurations. In some implementations, beam configurations may refer to TCI states. Beam configurations may refer to one or more configurations or settings for transmitting uplink signaling, receiving downlink signaling, or both, such as TCI states. In some cases, the control signal may include one or more RRC messages that provide linked SS sets, which may be used for repetitions of control channel transmissions.

At 620, the second network node 610 may transmit a MAC-CE message to the first network node 605 indicating which TCI states, as indicated by the control signal (e.g., RRC message), are activated. In some implementations, the MAC-CE message may indicate joint TCI states, single TCI states, or both, in accordance with a unified TCI procedure in which the TCI state may be applied for certain communications until switched (e.g., a "sticky" indication).

At 625, the second network node 610 may transmit a beam indication DCI to the first network node 605. In some cases, the beam indication DCI may indicate which TCI state(s) (e.g., in a TCI field codepoint) are associated with one or more communications instances the first network node 605 may utilize to communicate with the second network node 610, such as discussed with reference to the examples of FIGS. 2 through 5. At 630, the second network node 610 may transmit multiple repetitions of a scheduling DCI to the first network node 605, which may be transmitted in linked SS sets and indicate allocated resources for one or more uplink or downlink communications.

At 635, the first network node 605 may determine one or more TCI state(s) for communications based on one or more CORESETs associated with instances of the DCI repetitions, such as discussed with reference to the examples of FIGS. 2 through 5. In such implementations, the first network node 605 may utilize an uplink TCI state and a downlink TCI state to perform uplink and downlink communications with the second network node 610. In some implementations, the DCI may activate an uplink TCI state for uplink communications, or a downlink TCI state for downlink communications, or both. At 640, associated with the determination of the TCI state, the first network node 605 may receive downlink communications with the second network node 610. Optionally associated with the determination of the TCI state, the first network node 605 may perform uplink communications with the second network node 610.

Figure 7:
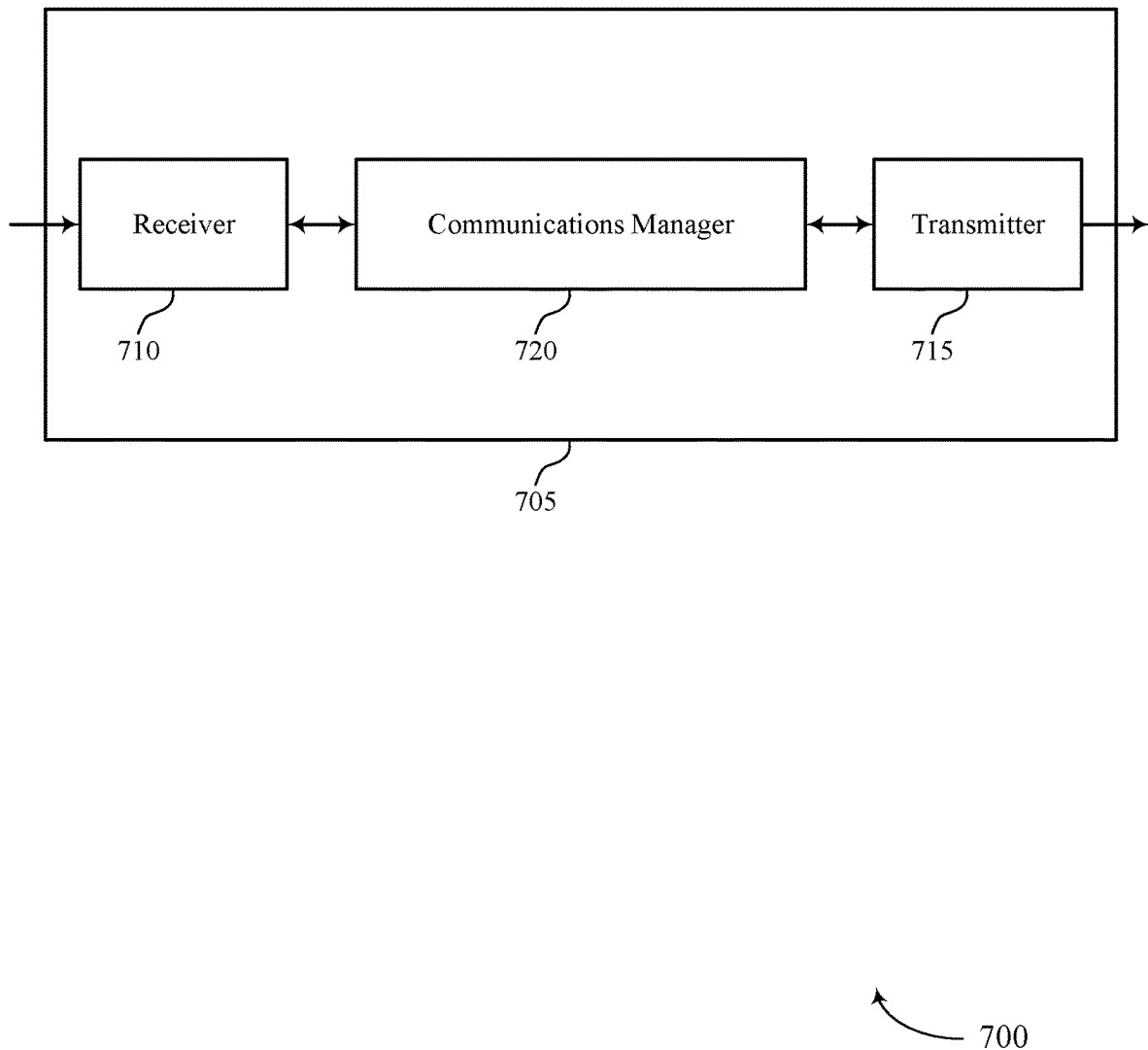
FIGS. 7 and 8 show block diagrams of devices that support TCI state determination based on multiple control channel repetitions in accordance with aspects of the present disclosure.

FIG. 7 shows a block diagram 700 of a device 705 that supports transmission configuration indicator state determination based on multiple control channel repetitions in accordance with aspects of the present disclosure. The device 705 may be an example of aspects of a UE 115 or a network node as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to transmission configuration indicator state determination based on multiple control channel repetitions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to transmission configuration indicator state determination based on multiple control channel repetitions). In some aspects, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of transmission configuration indicator state determination based on multiple control channel repetitions as described herein. For example, the communications manager 720, the receiver 710, the transmitter 715, or various combinations or components thereof may support a method for performing one or more of the functions described herein.

In some aspects, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally or alternatively, in some aspects, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some aspects, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

For example, the communications manager 720 may be associated with a first network node and may be configured as or otherwise support a means for receiving, from a second network node, first control information that indicates two or more linked search space sets, where each of the two or more linked search space sets includes an instance of a first control channel communication, and where each respective linked search space set of the two or more linked search space sets is associated with a respective control resource set. The communications manager 720 may be configured as or otherwise support a means for receiving, from the second network node, second control information that indicates one or more TCI states of one or more control resource sets associated with the two or more linked search space sets, where the one or more TCI states are used for at least a subset of communications between the first network node and the second network node after a period of time. The communications manager 720 may be configured as or otherwise support a means for decoding at least one instance of the first control channel communication from at least one of the two or more linked search space sets, the first control channel communication indicating a resource allocation for a first downlink communication. The communications manager 720 may be configured as or otherwise support a means for determining, based on the second control information, whether a first TCI state of the one or more TCI states, or a second TCI state that is different than the one or more TCI states, is used for the first downlink communication. The communications manager 720 may be configured as or otherwise support a means for receiving, from the second network node, the first downlink communication based on the determining.

By including or configuring the communications manager 720 in accordance with aspects as described herein, the device 705 (e.g., a processor controlling or otherwise coupled to the receiver 710, the transmitter 715, the communications manager 720, or a combination thereof) may support techniques for selection of one or more particular TCI states for a one or more communications based on a CORESET of one or multiple control channel repetitions associated with the one or more communications, which may provide for reduced signaling overhead, increased flexibility, more efficient use of spatial resources, decreased collisions and interference, increased reliability of communications, and improved user experience.

Figure 8:
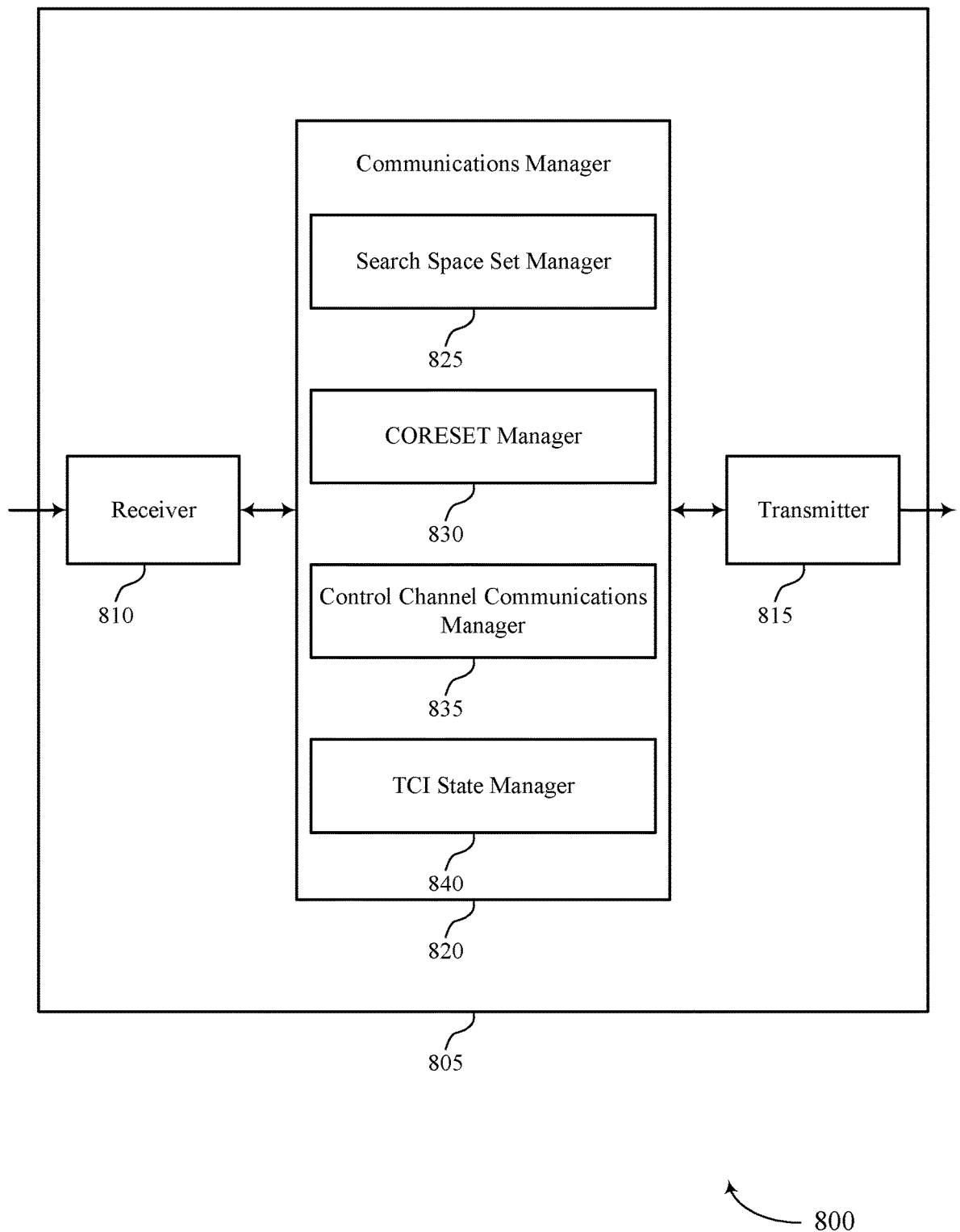

FIG. 8 shows a block diagram 800 of a device 805 that supports transmission configuration indicator state determination based on multiple control channel repetitions in accordance with aspects of the present disclosure. The device 805 may be an example of aspects of a device 705, a UE 115, or a first network node as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to transmission configuration indicator state determination based on multiple control channel repetitions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to transmission configuration indicator state determination based on multiple control channel repetitions). In some aspects, the transmitter 815 may be co-located with a receiver 810 in a transceiver module. The transmitter 815 may utilize a single antenna or a set of multiple antennas.

The device 805, or various components thereof, may be an example of means for performing various aspects of transmission configuration indicator state determination based on multiple control channel repetitions as described herein. For example, the communications manager 820 may include a search space set manager 825, a CORESET manager 830, a control channel communications manager 835, a TCI state manager 840, or any combination thereof. The communications manager 820 may be an example of aspects of a communications manager 720 as described herein. In some aspects, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The search space set manager 825 may be configured as or otherwise support a means for receiving, from a second network node, first control information that indicates two or more linked search space sets, where each of the two or more linked search space sets includes an instance of a first control channel communication, and where each respective linked search space set of the two or more linked search space sets is associated with a respective control resource set. The CORESET manager 830 may be configured as or otherwise support a means for receiving, from the second network node, second control information that indicates one or more TCI states of one or more control resource sets associated with the two or more linked search space sets, where the one or more TCI states are used for at least a subset of communications between the first network node and the second network node after a period of time. The control channel communications manager 835 may be configured as or otherwise support a means for decoding at least one instance of the first control channel communication from at least one of the two or more linked search space sets, the first control channel communication indicating a resource allocation for a first downlink communication. The TCI state manager 840 may be configured as or otherwise support a means for determining, based on the second control information, whether a first TCI state of the one or more TCI states, or a second TCI state that is different than the one or more TCI states, is used for the first downlink communication. The TCI state manager 840 may be configured as or otherwise support a means for receiving, from the second network node, the first downlink communication based on the determining.

Figure 9:
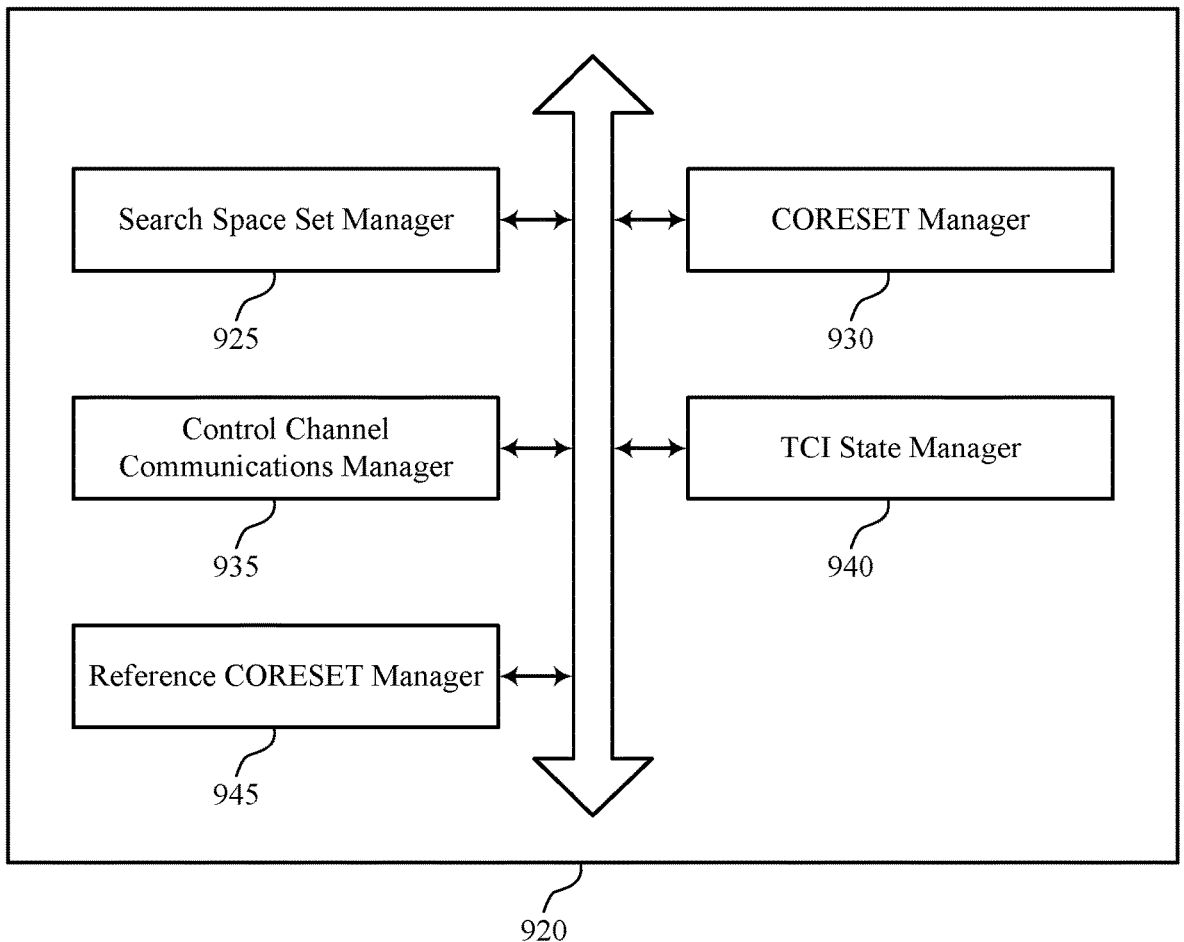
FIG. 9 shows a block diagram of a communications manager that supports TCI state determination based on multiple control channel repetitions in accordance with aspects of the present disclosure.

FIG. 9 shows a block diagram 900 of a communications manager 920 that supports transmission configuration indicator state determination based on multiple control channel repetitions in accordance with aspects of the present disclosure. The communications manager 920 may be an example of aspects of a communications manager 720, a communications manager 820, or both, as described herein. The communications manager 920, or various components thereof, may be an example of means for performing various aspects of transmission configuration indicator state determination based on multiple control channel repetitions as described herein. For example, the communications manager 920 may include a search space set manager 925, a CORESET manager 930, a control channel communications manager 935, a TCI state manager 940, a reference CORESET manager 945, or any combination thereof. Each of these components may communicate, directly or indirectly, with one another (e.g., via one or more buses).

The search space set manager 925 may be configured as or otherwise support a means for receiving, from a second network node, first control information that indicates two or more linked search space sets, where each of the two or more linked search space sets includes an instance of a first control channel communication, and where each respective linked search space set of the two or more linked search space sets is associated with a respective control resource set. The CORESET manager 930 may be configured as or otherwise support a means for receiving, from the second network node, second control information that indicates one or more TCI states of one or more control resource sets associated with the two or more linked search space sets, where the one or more TCI states are used for at least a subset of communications between the first network node and the second network node after a period of time. The control channel communications manager 935 may be configured as or otherwise support a means for decoding at least one instance of the first control channel communication from at least one of the two or more linked search space sets, the first control channel communication indicating a resource allocation for a first downlink communication. The TCI state manager 940 may be configured as or otherwise support a means for determining, based on the second control information, whether a first TCI state of the one or more TCI states, or a second TCI state that is different than the one or more TCI states, is used for the first downlink communication. In some aspects, the TCI state manager 940 may be configured as or otherwise support a means for receiving, from the second network node, the first downlink communication based on the determining.

In some aspects, to support determining, the TCI state manager 940 may be configured as or otherwise support a means for determining that the first downlink communication has the first TCI state based on a reference control resource set that is associated with the two or more linked search space sets having the first TCI state. In some aspects, the first control information includes information indicative of a monitoring occasion and an associated control resource set for each search space set of the two or more linked search space sets, where each respective control resource set has an associated TCI state. In some aspects, the reference CORESET manager 945 may be configured as or otherwise support a means for determining that a first control resource set associated with the two or more linked search space sets is a reference control resource set based on a first control resource set identification value of the first control resource set relative to other control resource set identification values of one or more other control resource sets associated with the two or more linked search space sets.

In some aspects, the TCI state manager 940 may be configured as or otherwise support a means for determining that a first control resource set associated with the two or more linked search space sets is a reference control resource set based on an index value of an associated first search space set relative to index values of one or more other of the two or more linked search space sets.

In some aspects, the reference CORESET manager 945 may be configured as or otherwise support a means for determining that a first control resource set associated with the two or more linked search space sets is a reference control resource set based on a starting or ending time of an associated first search space set relative to other starting or ending times of other of the two or more linked search space sets. In some aspects, the reference CORESET manager 945 may be configured as or otherwise support a means for determining that a first control resource set associated with the two or more linked search space sets is a reference control resource set based on a control resource set type of each of two or more control resource sets associated with the two or more linked search space sets.

In some aspects, the first control resource set has a predetermined control resource set type of a set of multiple available control resource set types. In some aspects, the first control resource set has a respective control resource set type that provides dedicated reception for the first network node. In some aspects, the first control resource set has a respective control resource set type that provides non-dedicated reception for the first network node. In some aspects, the first control resource set is determined to be the reference control resource set based at on a control resource set type priority order and a first control resource set type of the first control resource set.

In some aspects, a TCI state of a reference control resource set is used for receiving the first downlink communication, and where the reference control resource set is determined based on a control resource set type of the reference control resource set. In some aspects, each control resource set associated with each of the two or more linked search space sets has a same control resource set type that corresponds to the reference control resource set. In some aspects, each control resource set associated with each of the two or more linked search space sets has an associated control resource set type that is included in a subset of a set of available control resource set types, and is selectable as the reference control resource set. In some aspects, the reference control resource set is selected based on a radio network temporary identifier associated with the first control channel communication.

Figure 10:
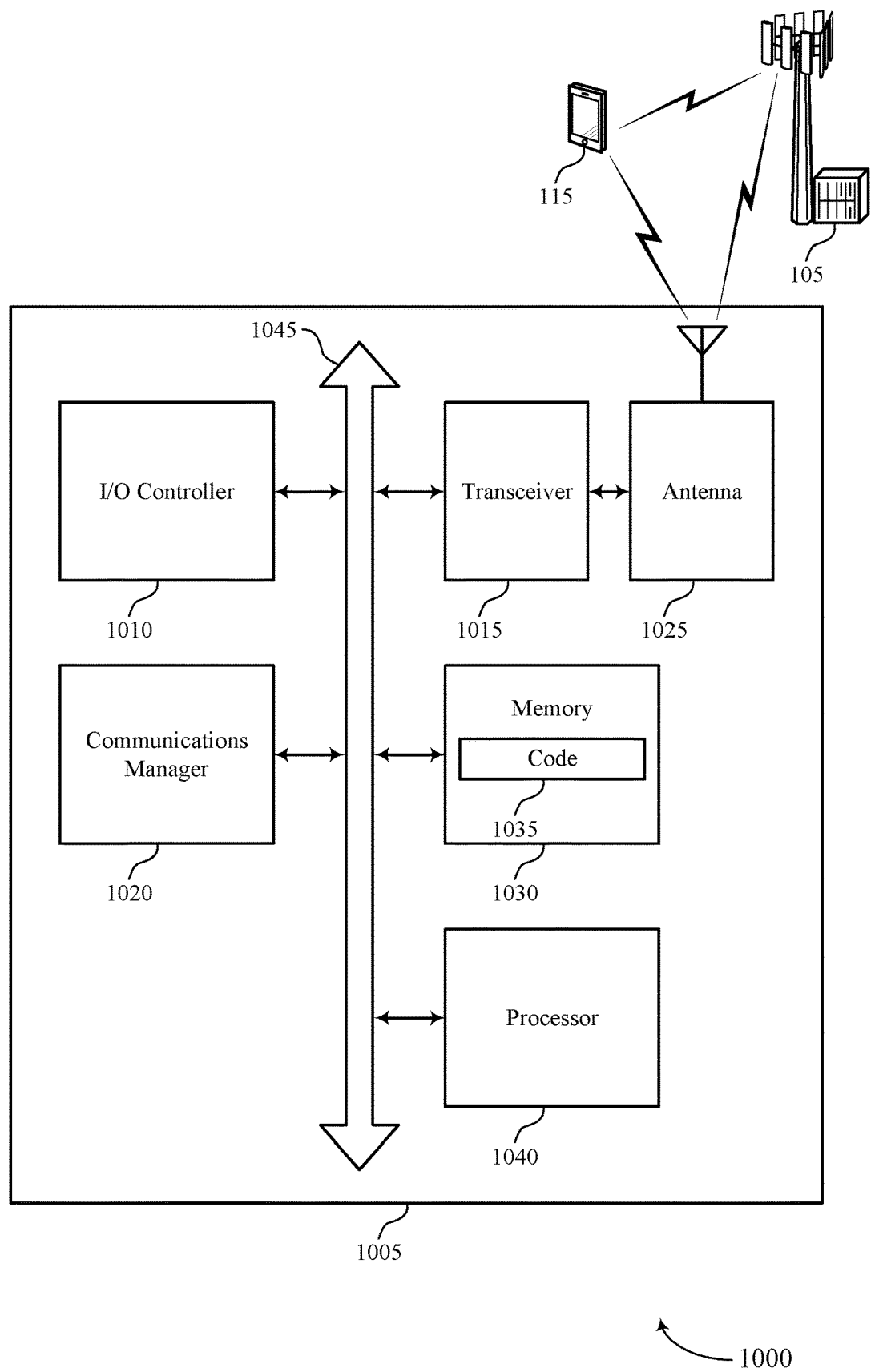
FIG. 10 shows a diagram of a system including a device that supports TCI state determination based on multiple control channel repetitions in accordance with aspects of the present disclosure.

FIG. 10 shows a diagram of a system 1000 including a device 1005 that supports transmission configuration indicator state determination based on multiple control channel repetitions in accordance with aspects of the present disclosure. The device 1005 may be an example of or include the components of a device 705, a device 805, a UE 115, or a network node as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting transmission configuration indicator state determination based on multiple control channel repetitions). For example, the device 1005 or a component of the device 1005 may include a processor 1040 and memory 1030 coupled with or to the processor 1040, the processor 1040 and memory 1030 configured to perform various functions described herein.

For example, the communications manager 1020 may be associated with a first network node and may be configured as or otherwise support a means for receiving, from a second network node, first control information that indicates two or more linked search space sets, where each of the two or more linked search space sets includes an instance of a first control channel communication, and where each respective linked search space set of the two or more linked search space sets is associated with a respective control resource set. The communications manager 1020 may be configured as or otherwise support a means for receiving, from the second network node, second control information that indicates one or more TCI states of one or more control resource sets associated with the two or more linked search space sets, where the one or more TCI states are used for at least a subset of communications between the first network node and the second network node after a period of time. The communications manager 1020 may be configured as or otherwise support a means for decoding at least one instance of the first control channel communication from at least one of the two or more linked search space sets, the first control channel communication indicating a resource allocation for a first downlink communication. The communications manager 1020 may be configured as or otherwise support a means for determining, based on the second control information, whether a first TCI state of the one or more TCI states, or a second TCI state that is different than the one or more TCI states, is used for the first downlink communication. The communications manager 1020 may be configured as or otherwise support a means for receiving, from the second network node, the first downlink communication based on the determining.

By including or configuring the communications manager 1020 in accordance with aspects as described herein, the device 1005 may support techniques for selection of one or more particular TCI states for a one or more communications based on a CORESET of one or multiple control channel repetitions associated with the one or more communications, which may provide for reduced signaling overhead, increased flexibility, more efficient use of spatial resources, decreased collisions and interference, increased reliability of communications, and improved user experience.

In some aspects, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some aspects, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of transmission configuration indicator state determination based on multiple control channel repetitions as described herein, or the processor 1040 and the memory 1030 may be otherwise configured to perform or support such operations.

Figure 11:
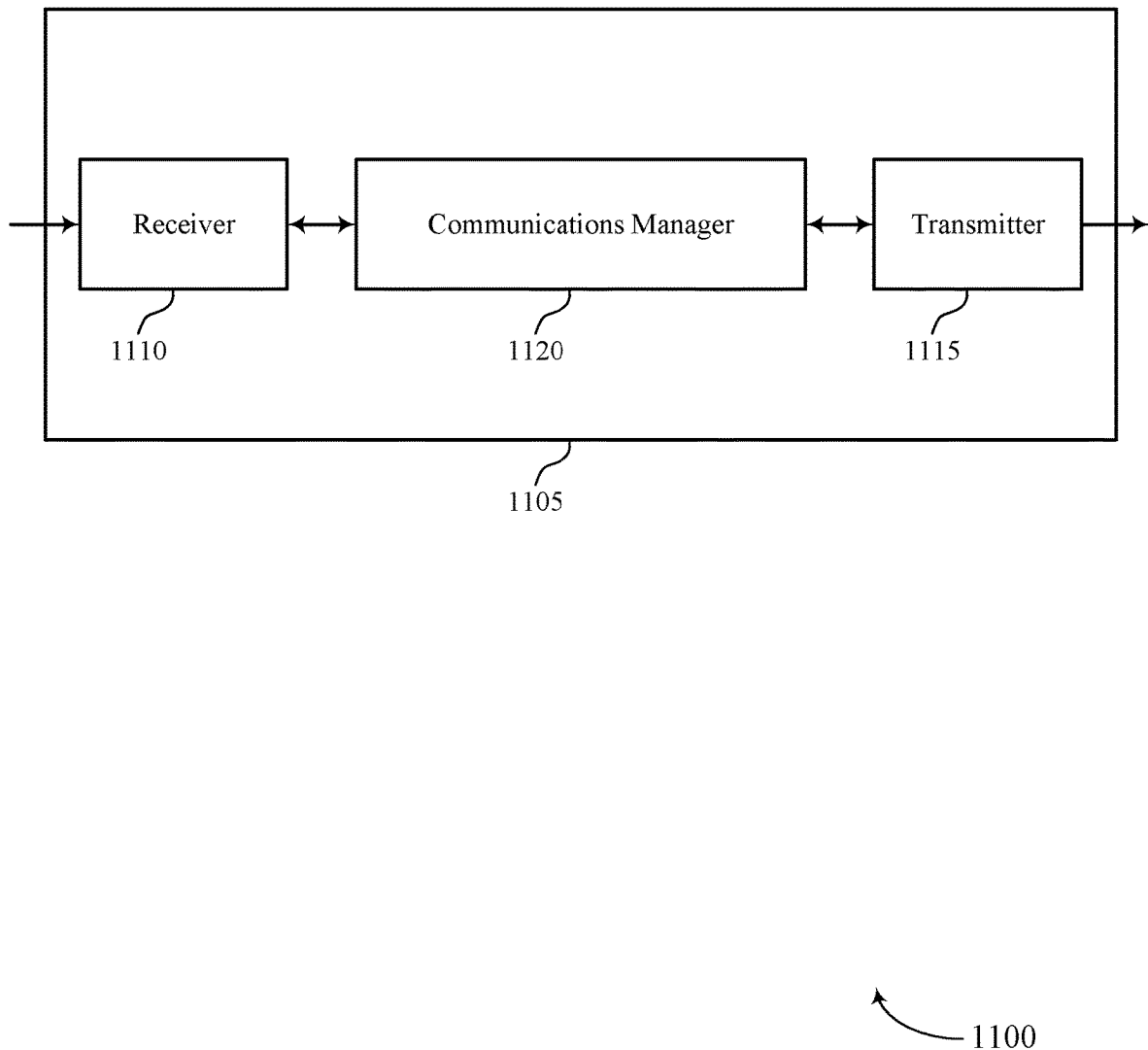
FIGS. 11 and 12 show block diagrams of devices that support TCI state determination based on multiple control channel repetitions in accordance with aspects of the present disclosure.

FIG. 11 shows a block diagram 1100 of a device 1105 that supports transmission configuration indicator state determination based on multiple control channel repetitions in accordance with aspects of the present disclosure. The device 1105 may be an example of aspects of a base station 105 or a network node as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to transmission configuration indicator state determination based on multiple control channel repetitions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to transmission configuration indicator state determination based on multiple control channel repetitions). In some aspects, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of transmission configuration indicator state determination based on multiple control channel repetitions as described herein. For example, the communications manager 1120, the receiver 1110, the transmitter 1115, or various combinations or components thereof may support a method for performing one or more of the functions described herein.

In some aspects, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally or alternatively, in some aspects, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some aspects, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

For example, the communications manager 1120 may be associated with a first network node and may be configured as or otherwise support a means for transmitting, to a second network node, first control signaling that indicates two or more linked search space sets, where each of the two or more linked search space sets includes an instance of a first control channel communication, and where each respective linked search space set of the two or more linked search space sets is associated with a respective control resource set. The communications manager 1120 may be configured as or otherwise support a means for transmitting, to the second network node, second control information that indicates one or more TCI states of one or more control resource sets associated with the two or more linked search space sets, where the one or more TCI states are used for at least a subset of communications between the first network node and the second network node after a period of time. The communications manager 1120 may be configured as or otherwise support a means for determining to use a first TCI state of the one or more TCI states for a first downlink communication from the first network node to the second network node. The communications manager 1120 may be configured as or otherwise support a means for transmitting a first instance of the first control channel communication in a first search space set of the two or more linked search space sets, and a second instance of the first control channel communication in a second search space set of the two or more linked search space sets, the first control channel communication indicating a resource allocation for the first downlink communication. The communications manager 1120 may be configured as or otherwise support a means for transmitting the first downlink communication using the first TCI state.

By including or configuring the communications manager 1120 in accordance with aspects as described herein, the device 1105 (e.g., a processor controlling or otherwise coupled to the receiver 1110, the transmitter 1115, the communications manager 1120, or a combination thereof) may support techniques for selection of one or more particular TCI states for a one or more communications based on a CORESET of one or multiple control channel repetitions associated with the one or more communications, which may provide for reduced signaling overhead, increased flexibility, more efficient use of spatial resources, decreased collisions and interference, increased reliability of communications, and improved user experience.

Figure 12:
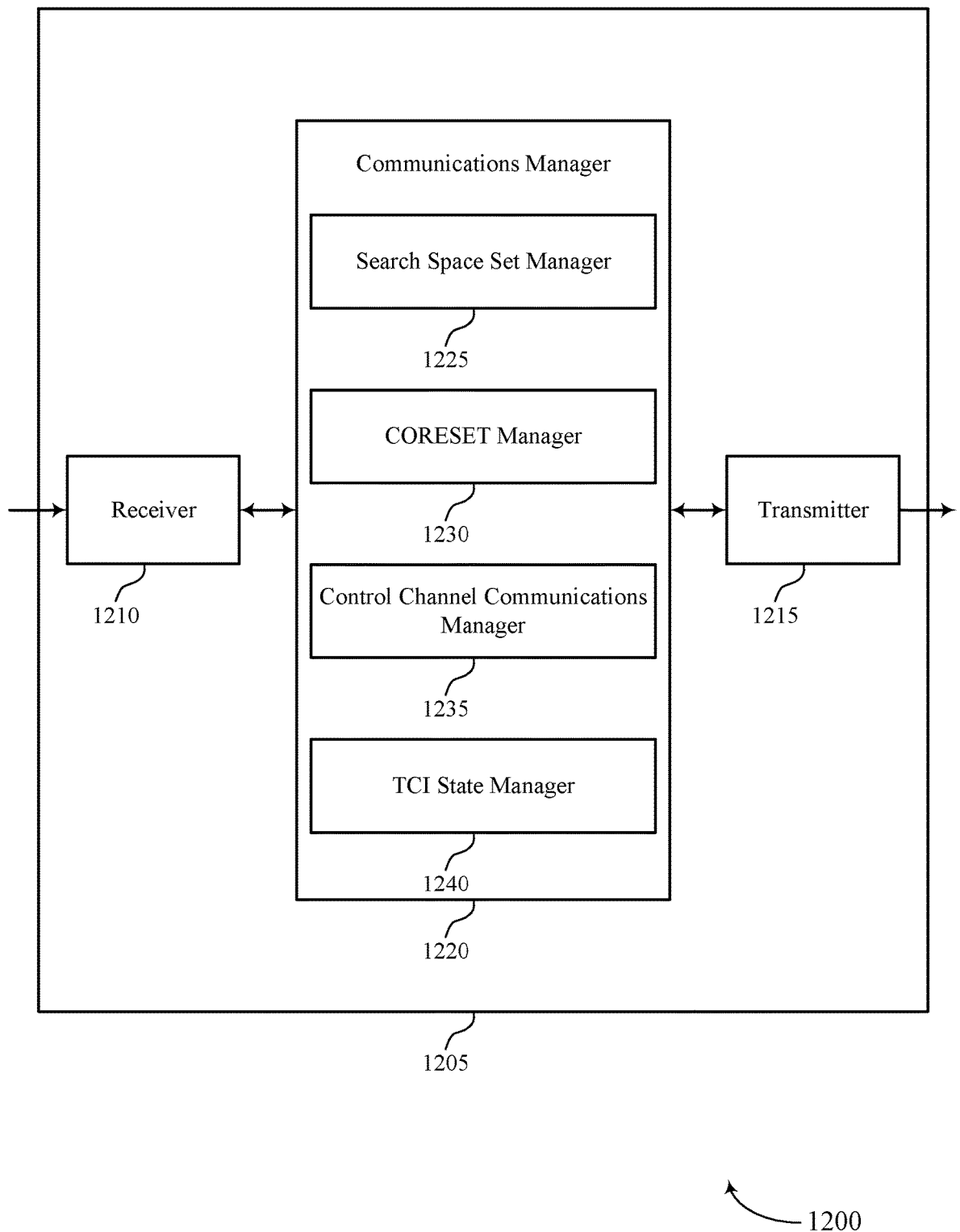

FIG. 12 shows a block diagram 1200 of a device 1205 that supports transmission configuration indicator state determination based on multiple control channel repetitions in accordance with aspects of the present disclosure. The device 1205 may be an example of aspects of a device 1105, a base station 105, or a first network node as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to transmission configuration indicator state determination based on multiple control channel repetitions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to transmission configuration indicator state determination based on multiple control channel repetitions). In some aspects, the transmitter 1215 may be co-located with a receiver 1210 in a transceiver module. The transmitter 1215 may utilize a single antenna or a set of multiple antennas.

The device 1205, or various components thereof, may be an example of means for performing various aspects of transmission configuration indicator state determination based on multiple control channel repetitions as described herein. For example, the communications manager 1220 may include a search space set manager 1225, a CORESET manager 1230, a TCI state manager 1235, a control channel communications manager 1240, or any combination thereof. The communications manager 1220 may be an example of aspects of a communications manager 1120 as described herein. In some aspects, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The search space set manager 1225 may be configured as or otherwise support a means for transmitting, to a second network node, first control signaling that indicates two or more linked search space sets, where each of the two or more linked search space sets includes an instance of a first control channel communication, and where each respective linked search space set of the two or more linked search space sets is associated with a respective control resource set. The CORESET manager 1230 may be configured as or otherwise support a means for transmitting, to the second network node, second control information that indicates one or more TCI states of one or more control resource sets associated with the two or more linked search space sets, where the one or more TCI states are used for at least a subset of communications between the first network node and the second network node after a period of time. The TCI state manager 1235 may be configured as or otherwise support a means for determining to use a first TCI state of the one or more TCI states for a first downlink communication from the first network node to the second network node. The control channel communications manager 1240 may be configured as or otherwise support a means for transmitting a first instance of the first control channel communication in a first search space set of the two or more linked search space sets, and a second instance of the first control channel communication in a second search space set of the two or more linked search space sets, the first control channel communication indicating a resource allocation for the first downlink communication. The TCI state manager 1235 may be configured as or otherwise support a means for transmitting the first downlink communication using the first TCI state.

Figure 13:
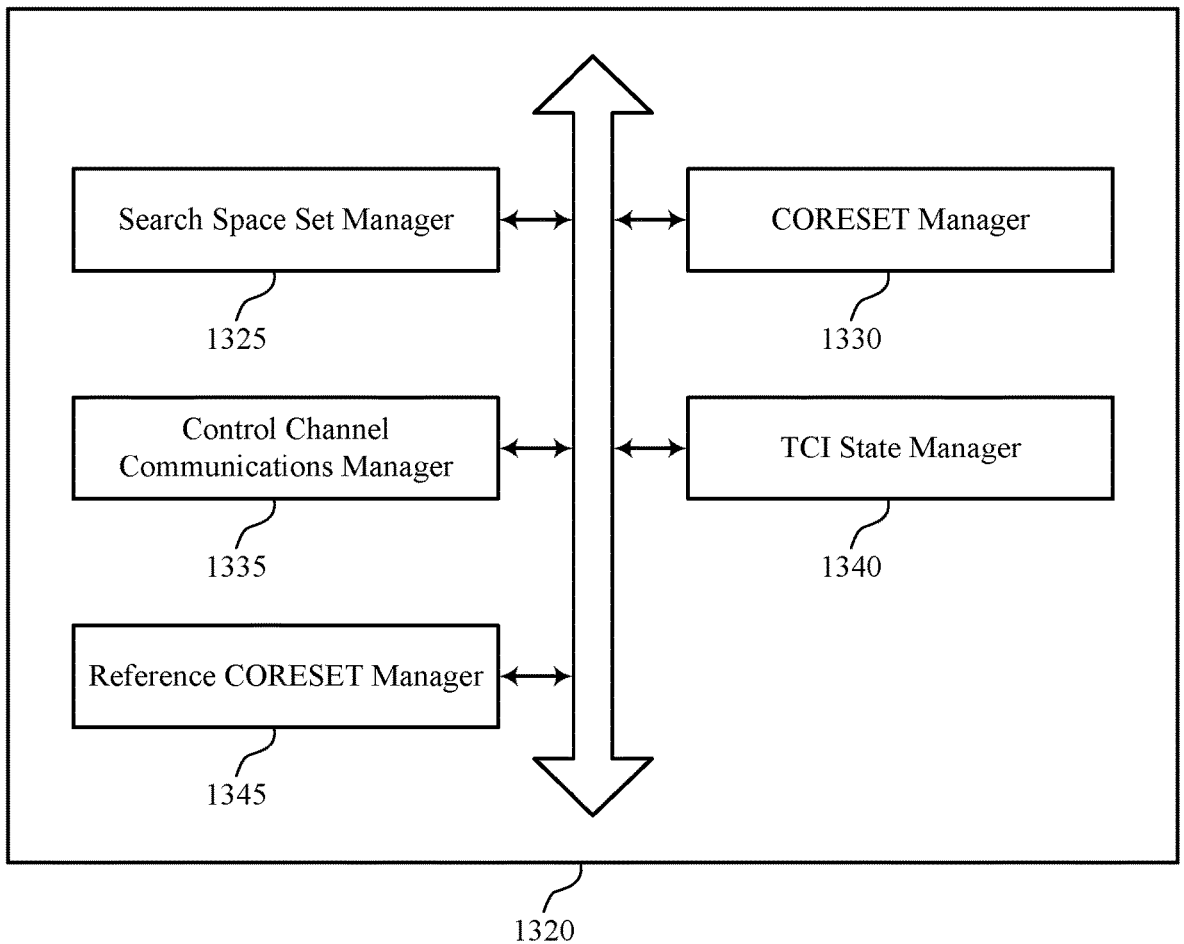
FIG. 13 shows a block diagram of a communications manager that supports TCI state determination based on multiple control channel repetitions in accordance with aspects of the present disclosure.

FIG. 13 shows a block diagram 1300 of a communications manager 1320 that supports transmission configuration indicator state determination based on multiple control channel repetitions in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of transmission configuration indicator state determination based on multiple control channel repetitions as described herein. For example, the communications manager 1320 may include a search space set manager 1325, a CORESET manager 1330, a TCI state manager 1335, a control channel communications manager 1340, a reference CORESET manager 1345, or any combination thereof. Each of these components may communicate, directly or indirectly, with one another (e.g., via one or more buses).

The search space set manager 1325 may be configured as or otherwise support a means for transmitting, to a second network node, first control signaling that indicates two or more linked search space sets, where each of the two or more linked search space sets includes an instance of a first control channel communication, and where each respective linked search space set of the two or more linked search space sets is associated with a respective control resource set. The CORESET manager 1330 may be configured as or otherwise support a means for transmitting, to the second network node, second control information that indicates one or more TCI states of one or more control resource sets associated with the two or more linked search space sets, where the one or more TCI states are used for at least a subset of communications between the first network node and the second network node after a period of time. The TCI state manager 1335 may be configured as or otherwise support a means for determining to use a first TCI state of the one or more TCI states for a first downlink communication from the first network node to the second network node. The control channel communications manager 1340 may be configured as or otherwise support a means for transmitting a first instance of the first control channel communication in a first search space set of the two or more linked search space sets, and a second instance of the first control channel communication in a second search space set of the two or more linked search space sets, the first control channel communication indicating a resource allocation for the first downlink communication. In some aspects, the TCI state manager 1335 may be configured as or otherwise support a means for transmitting the first downlink communication using the first TCI state.

In some aspects, the first TCI state is applied to the first downlink communication based on a reference control resource set that is associated with the two or more linked search space sets having the first TCI state. In some aspects, the first control information includes information indicative of a monitoring occasion and an associated control resource set for each search space set of the two or more linked search space sets, where each respective control resource set has an associated transmission configuration indicator state.

In some aspects, the reference CORESET manager 1345 may be configured as or otherwise support a means for determining that a first control resource set associated with the two or more linked search space sets is a reference control resource set based on a first control resource set identification value of the first control resource set relative to other control resource set identification values of one or more other control resource sets associated with the two or more linked search space sets. In some aspects, the reference CORESET manager 1345 may be configured as or otherwise support a means for determining that a first control resource set associated with the two or more linked search space sets is a reference control resource set based on a control resource set type of each of two or more control resource sets associated with the two or more linked search space sets. In some aspects, the reference CORESET manager 1345 may be configured as or otherwise support a means for determining that a first control resource set associated with the two or more linked search space sets is a reference control resource set based on an index value of an associated first search space set relative to index values of one or more other of the two or more linked search space sets.

In some aspects, a predetermined first control resource set type of a set of multiple available control resource set types, an associated control resource set type that provides dedicated reception for the second network node, an associated control resource set type that provides non-dedicated reception for the second network node, or a control resource set type priority order. In some aspects, the reference CORESET manager 1345 may be configured as or otherwise support a means for selecting a first control resource set of the one or more control resource sets as a reference control resource set based on a starting or ending time of an associated first search space set relative to other starting or ending times of other of the two or more linked search space sets. In some aspects, the TCI state of a reference control resource set is used for transmitting the first downlink communication, and where the reference control resource set is determined based on a control resource set type of the reference control resource set.

Figure 14:
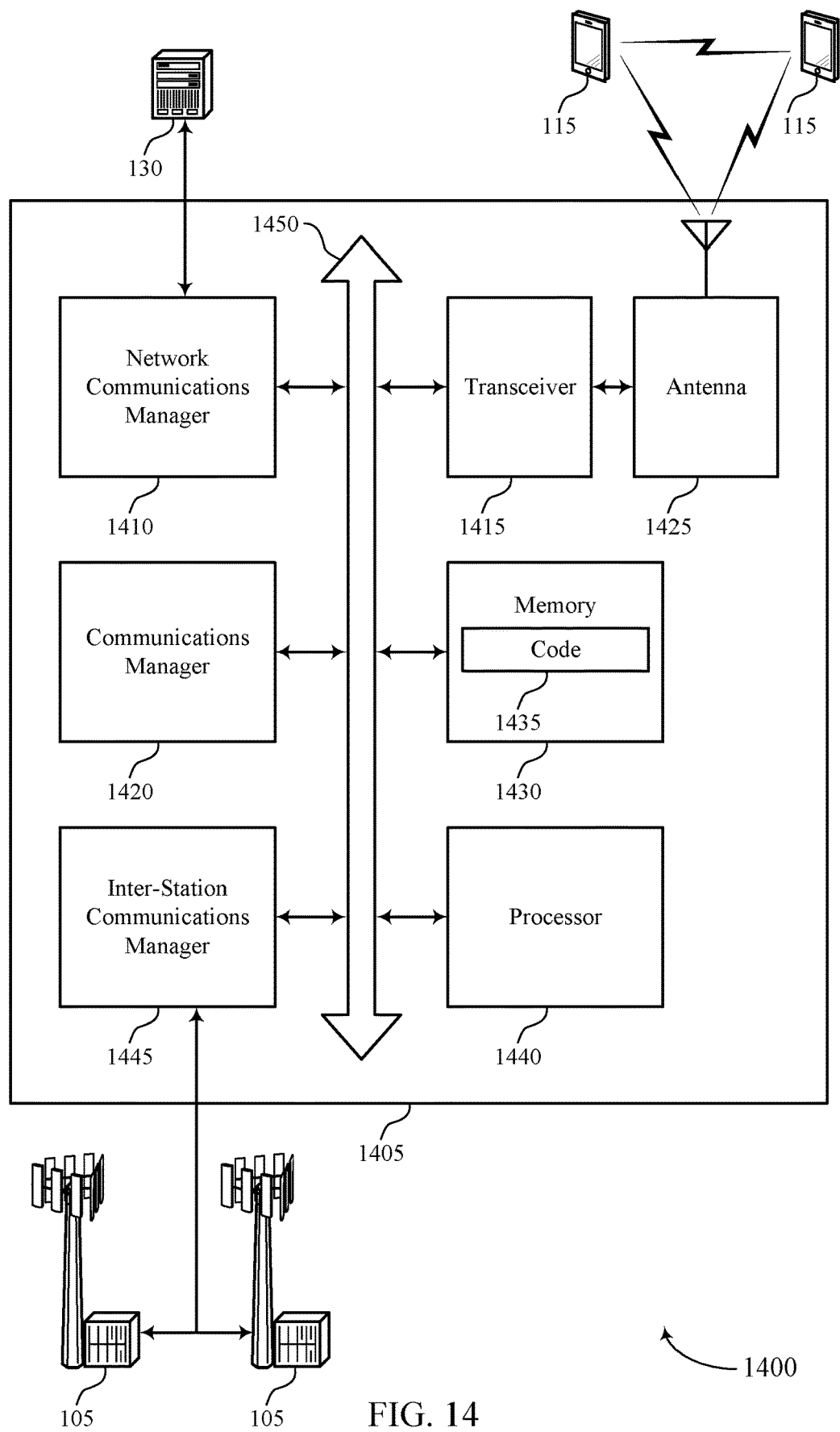
FIG. 14 shows a diagram of a system including a device that supports TCI state determination based on multiple control channel repetitions in accordance with aspects of the present disclosure.

FIG. 14 shows a diagram of a system 1400 including a device 1405 that supports transmission configuration indicator state determination based on multiple control channel repetitions in accordance with aspects of the present disclosure. The device 1405 may be an example of or include the components of a device 1105, a device 1205, a base station 105, or a network node as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting transmission configuration indicator state determination based on multiple control channel repetitions). For example, the device 1405 or a component of the device 1405 may include a processor 1440 and memory 1430 coupled with or to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some aspects, the inter-station communications manager 1445 may provide an X2 interface within an LTE/LTE-A wireless communications network technology to provide communication between base stations 105.

For example, the communications manager 1420 may be associated with a first network node and may be configured as or otherwise support a means for transmitting, to a second network node, first control signaling that indicates two or more linked search space sets, where each of the two or more linked search space sets includes an instance of a first control channel communication, and where each respective linked search space set of the two or more linked search space sets is associated with a respective control resource set. The communications manager 1420 may be configured as or otherwise support a means for transmitting, to the second network node, second control information that indicates one or more TCI states of one or more control resource sets associated with the two or more linked search space sets, where the one or more TCI states are used for at least a subset of communications between the first network node and the second network node after a period of time. The communications manager 1420 may be configured as or otherwise support a means for determining to use a first TCI state of the one or more TCI states for a first downlink communication from the first network node to the second network node. The communications manager 1420 may be configured as or otherwise support a means for transmitting a first instance of the first control channel communication in a first search space set of the two or more linked search space sets, and a second instance of the first control channel communication in a second search space set of the two or more linked search space sets, the first control channel communication indicating a resource allocation for the first downlink communication. The communications manager 1420 may be configured as or otherwise support a means for transmitting the first downlink communication using the first TCI state.

By including or configuring the communications manager 1420 in accordance with aspects as described herein, the device 1405 may support techniques for selection of one or more particular TCI states for a one or more communications based on a CORESET of one or multiple control channel repetitions associated with the one or more communications, which may provide for reduced signaling overhead, increased flexibility, more efficient use of spatial resources, decreased collisions and interference, increased reliability of communications, and improved user experience.

In some aspects, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some aspects, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of TCI state determination based on multiple control channel repetitions as described herein, or the processor 1440 and the memory 1430 may be otherwise configured to perform or support such operations.

Figure 15:
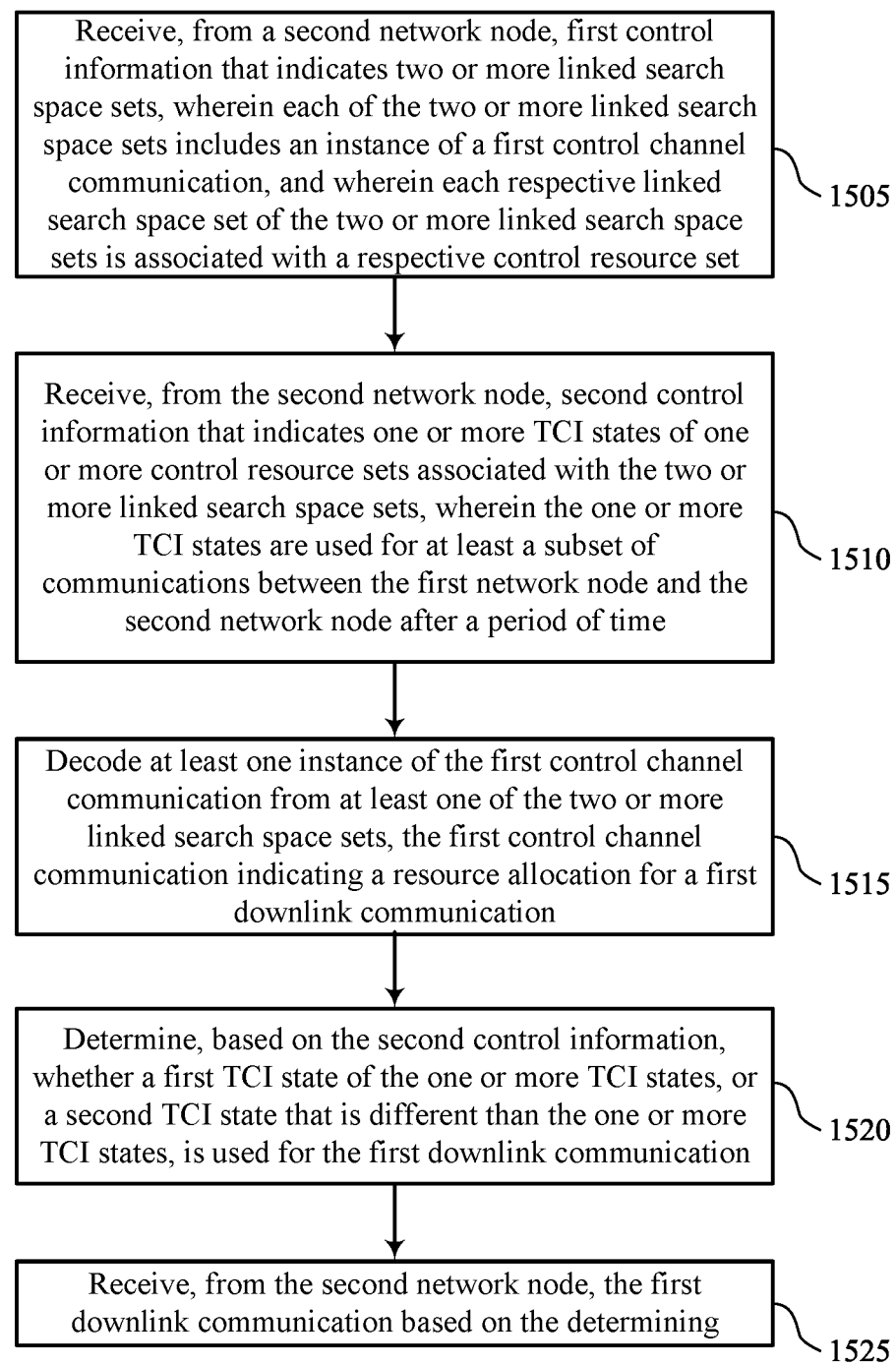
FIGS. 15 through 22 show flowcharts illustrating methods that support TCI state determination based on multiple control channel repetitions in accordance with aspects of the present disclosure.

FIG. 15 shows a flowchart illustrating a method 1500 that supports transmission configuration indicator state determination based on multiple control channel repetitions in accordance with aspects of the present disclosure. The operations of the method 1500 may be implemented by a network node or its components as described herein. For example, the operations of the method 1500 may be performed by a first network node (e.g., a UE 115) as described with reference to FIGS. 1 through 10. In some aspects, a UE may execute a set of instructions to control the functional elements of the UE to perform the described functions. Additionally or alternatively, the UE may perform aspects of the described functions using special-purpose hardware.

At 1505, the method may include receiving, from a second network node, first control information that indicates two or more linked search space sets, where each of the two or more linked search space sets includes an instance of a first control channel communication, and where each respective linked search space set of the two or more linked search space sets is associated with a respective control resource set. The operations of 1505 may be performed in accordance with aspects as disclosed herein. In some examples, aspects of the operations of 1505 may be performed by a search space set manager 925 as described with reference to FIG. 9.

At 1510, the method may include receiving, from the second network node, second control information that indicates one or more TCI states of one or more control resource sets associated with the two or more linked search space sets, where the one or more TCI states are used for at least a subset of communications between the first network node and the second network node after a period of time. The operations of 1510 may be performed in accordance with aspects as disclosed herein. In some examples, aspects of the operations of 1510 may be performed by a CORESET manager 930 as described with reference to FIG. 9.

At 1515, the method may include decoding at least one instance of the first control channel communication from at least one of the two or more linked search space sets, the first control channel communication indicating a resource allocation for a first downlink communication. The operations of 1515 may be performed in accordance with aspects as disclosed herein. In some examples, aspects of the operations of 1515 may be performed by a control channel communications manager 935 as described with reference to FIG. 9.

At 1520, the method may include determining, based on the second control information, whether a first TCI state of the one or more TCI states, or a second TCI state that is different than the one or more TCI states, is used for the first downlink communication. The operations of 1520 may be performed in accordance with aspects as disclosed herein. In some examples, aspects of the operations of 1520 may be performed by a TCI state manager 940 as described with reference to FIG. 9.

At 1525, the method may include receiving, from the second network node, the first downlink communication based on the determining. The operations of 1525 may be performed in accordance with aspects as disclosed herein. In some examples, aspects of the operations of 1525 may be performed by a TCI state manager 940 as described with reference to FIG. 9.

Figure 16:
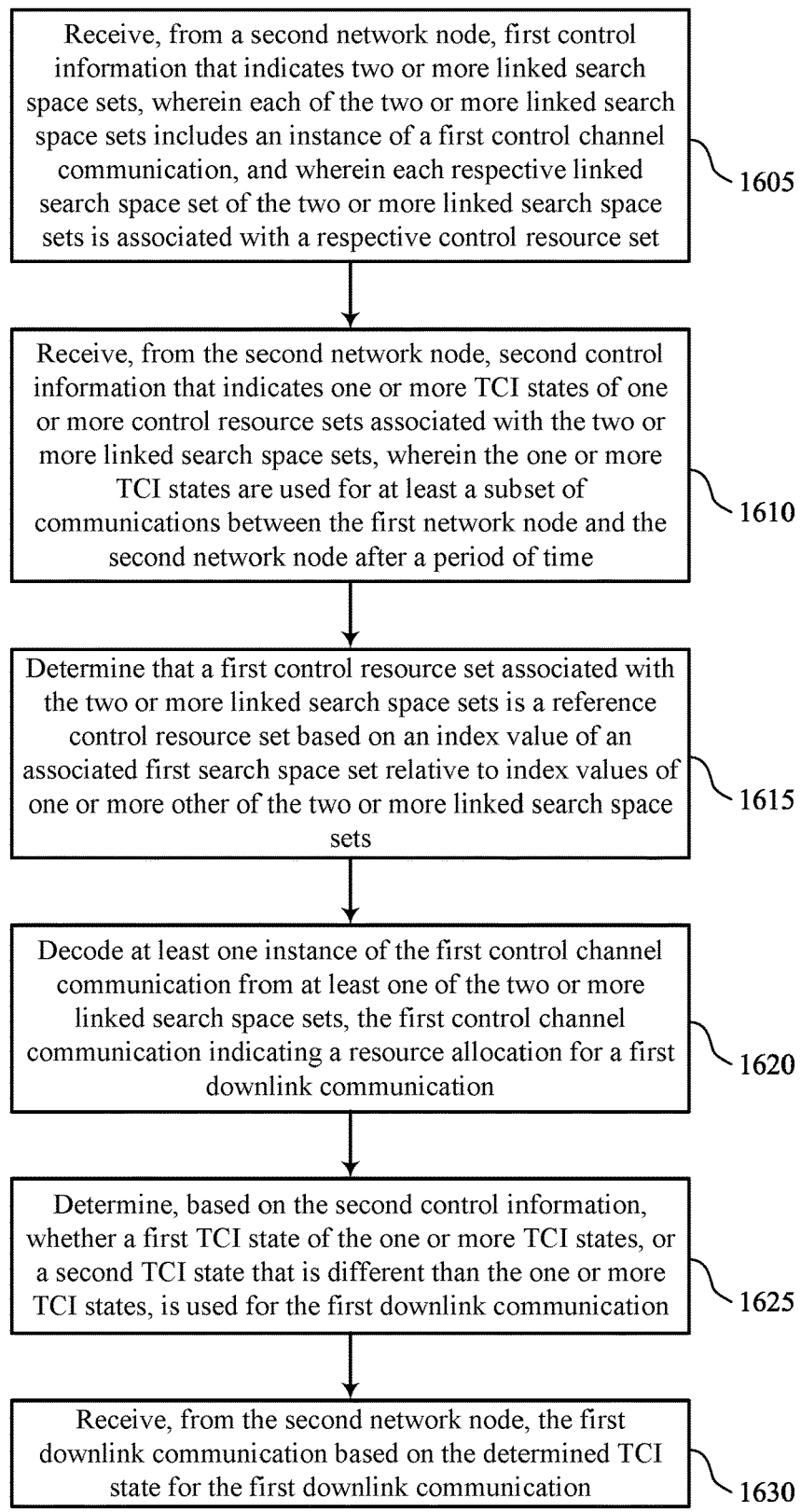

FIG. 16 shows a flowchart illustrating a method 1600 that supports transmission configuration indicator state determination based on multiple control channel repetitions in accordance with aspects of the present disclosure. The operations of the method 1600 may be implemented by a network node (e.g., a UE) or its components as described herein. For example, the operations of the method 1600 may be performed by a UE 115 as described with reference to FIGS. 1 through 10. In some aspects, a network node may execute a set of instructions to control the functional elements of the node to perform the described functions. Additionally or alternatively, the node may perform aspects of the described functions using special-purpose hardware.

At 1605, the method may include receiving, from a second network node, first control information that indicates two or more linked search space sets, where each of the two or more linked search space sets includes an instance of a first control channel communication, and where each respective linked search space set of the two or more linked search space sets is associated with a respective control resource set. The operations of 1605 may be performed in accordance with aspects as disclosed herein. In some examples, aspects of the operations of 1605 may be performed by a search space set manager 925 as described with reference to FIG. 9.

At 1610, the method may include receiving, from the second network node, second control information that indicates one or more TCI states of one or more control resource sets associated with the two or more linked search space sets, where the one or more TCI states are used for at least a subset of communications between the first network node and the second network node after a period of time. The operations of 1610 may be performed in accordance with aspects as disclosed herein. In some examples, aspects of the operations of 1610 may be performed by a CORESET manager 930 as described with reference to FIG. 9.

At 1615, the method may include determining that a first control resource set associated with the two or more linked search space sets is a reference control resource set based on an index value of an associated first search space set relative to index values of one or more other of the two or more linked search space sets. The operations of 1615 may be performed in accordance with aspects as disclosed herein. In some examples, aspects of the operations of 1615 may be performed by a TCI state manager 940 as described with reference to FIG. 9.

At 1620, the method may include decoding at least one instance of the first control channel communication from at least one of the two or more linked search space sets, the first control channel communication indicating a resource allocation for a first downlink communication. The operations of 1620 may be performed in accordance with aspects as disclosed herein. In some examples, aspects of the operations of 1620 may be performed by a control channel communications manager 935 as described with reference to FIG. 9.

At 1625, the method may include determining, based on the second control information, whether a first TCI state of the one or more TCI states, or a second TCI state that is different than the one or more TCI states, is used for the first downlink communication. The operations of 1625 may be performed in accordance with aspects as disclosed herein. In some examples, aspects of the operations of 1625 may be performed by a TCI state manager 940 as described with reference to FIG. 9.

At 1630, the method may include receiving, from the second network node, the first downlink communication based on the determined TCI state for the first downlink communication. The operations of 1630 may be performed in accordance with aspects as disclosed herein. In some examples, aspects of the operations of 1630 may be performed by a TCI state manager 940 as described with reference to FIG. 9.

Figure 17:
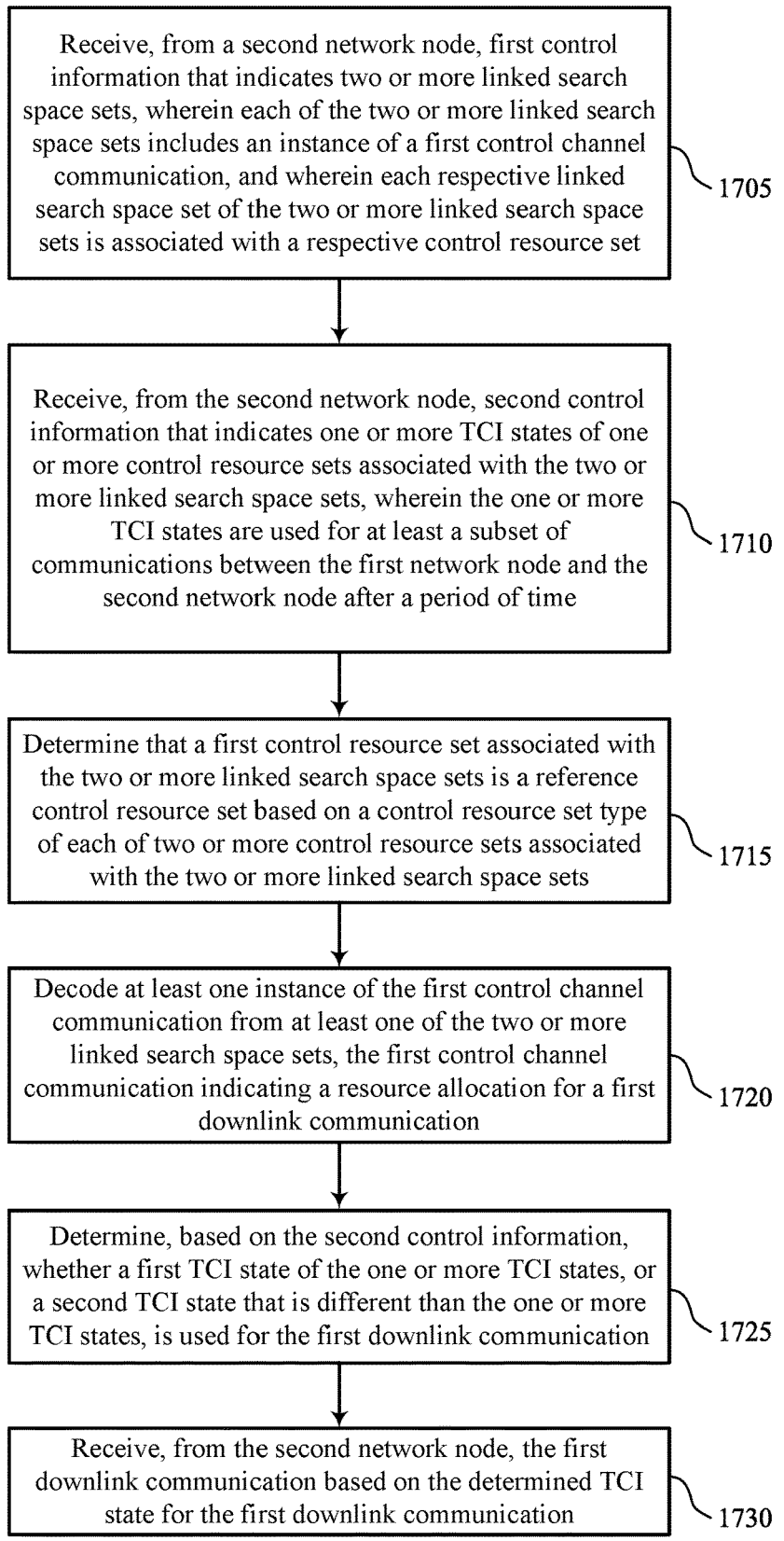

FIG. 17 shows a flowchart illustrating a method 1700 that supports transmission configuration indicator state determination based on multiple control channel repetitions in accordance with aspects of the present disclosure. The operations of the method 1700 may be implemented by a network node (e.g. a UE) or its components as described herein. For example, the operations of the method 1700 may be performed by a UE 115 as described with reference to FIGS. 1 through 10. In some aspects, a node may execute a set of instructions to control the functional elements of the node to perform the described functions. Additionally or alternatively, the node may perform aspects of the described functions using special-purpose hardware.

At 1705, the method may include receiving, from a second network node, first control information that indicates two or more linked search space sets, where each of the two or more linked search space sets includes an instance of a first control channel communication, and where each respective linked search space set of the two or more linked search space sets is associated with a respective control resource set. The operations of 1705 may be performed in accordance with aspects as disclosed herein. In some examples, aspects of the operations of 1705 may be performed by a search space set manager 925 as described with reference to FIG. 9.

At 1710, the method may include receiving, from the second network node, second control information that indicates one or more TCI states of one or more control resource sets associated with the two or more linked search space sets, where the one or more TCI states are used for at least a subset of communications between the first network node and the second network node after a period of time. The operations of 1710 may be performed in accordance with aspects as disclosed herein. In some examples, aspects of the operations of 1710 may be performed by a CORESET manager 930 as described with reference to FIG. 9.

At 1715, the method may include determining that a first control resource set associated with the two or more linked search space sets is a reference control resource set based on a control resource set type of each of two or more control resource sets associated with the two or more linked search space sets. The operations of 1715 may be performed in accordance with aspects as disclosed herein. In some examples, aspects of the operations of 1715 may be performed by a TCI state manager 940 as described with reference to FIG. 9.

At 1720, the method may include decoding at least one instance of the first control channel communication from at least one of the two or more linked search space sets, the first control channel communication indicating a resource allocation for a first downlink communication. The operations of 1720 may be performed in accordance with aspects as disclosed herein. In some examples, aspects of the operations of 1720 may be performed by a control channel communications manager 935 as described with reference to FIG. 9.

At 1725, the method may include determining, based on the second control information, whether a first TCI state of the one or more TCI states, or a second TCI state that is different than the one or more TCI states, is used for the first downlink communication. The operations of 1725 may be performed in accordance with aspects as disclosed herein. In some examples, aspects of the operations of 1725 may be performed by a TCI state manager 940 as described with reference to FIG. 9.

At 1730, the method may include receiving, from the second network node, the first downlink communication based on the determined TCI state for the first downlink communication. The operations of 1730 may be performed in accordance with aspects as disclosed herein. In some examples, aspects of the operations of 1730 may be performed by a TCI state manager 940 as described with reference to FIG. 9.

Figure 18:
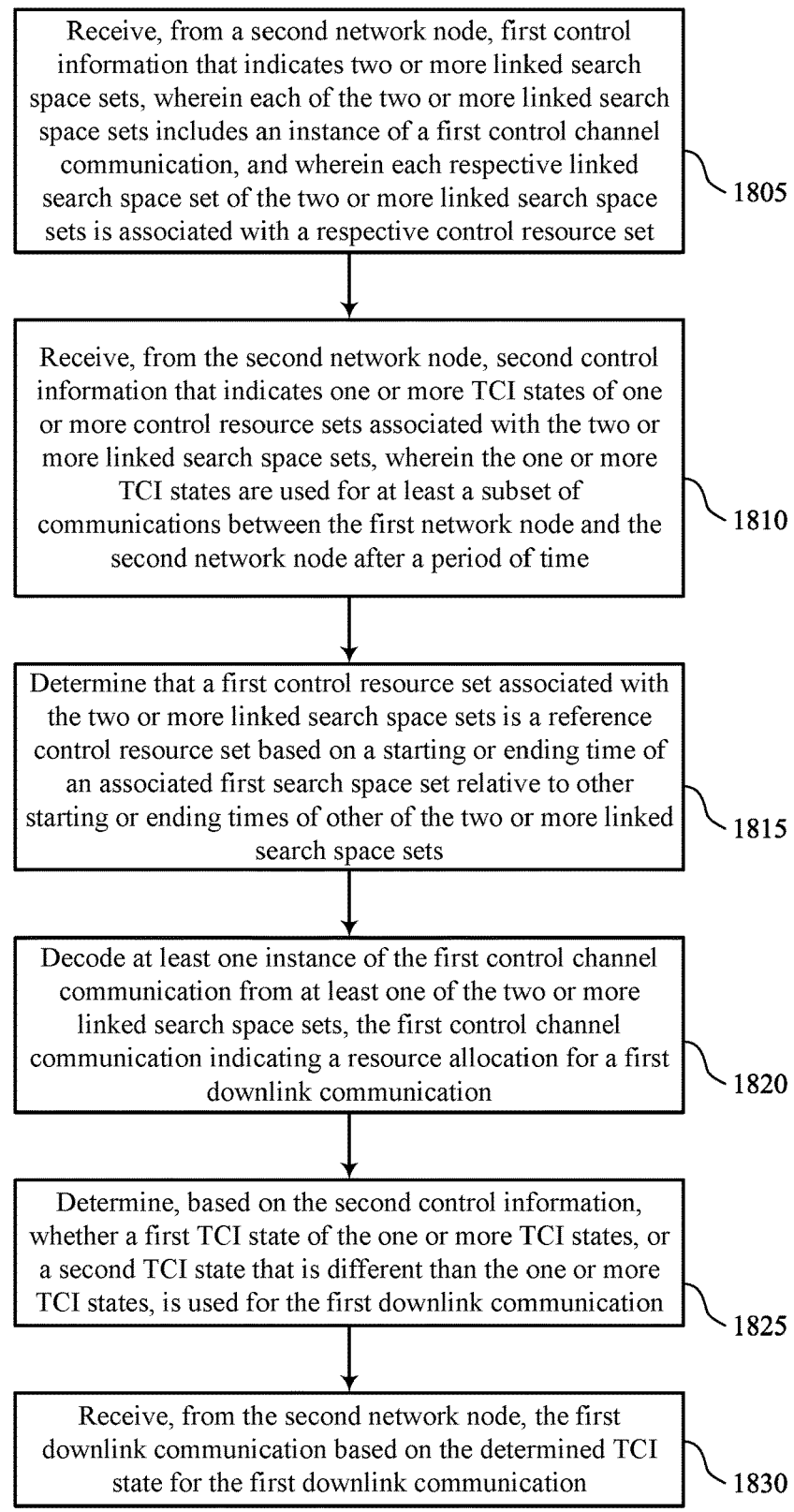

FIG. 18 shows a flowchart illustrating a method 1800 that supports transmission configuration indicator state determination based on multiple control channel repetitions in accordance with aspects of the present disclosure. The operations of the method 1800 may be implemented by a network node or its components as described herein. For example, the operations of the method 1800 may be performed by a UE 115 as described with reference to FIGS. 1 through 10. In some aspects, a node may execute a set of instructions to control the functional elements of the node to perform the described functions. Additionally or alternatively, the node may perform aspects of the described functions using special-purpose hardware.

At 1805, the method may include receiving, from a second network node, first control information that indicates two or more linked search space sets, where each of the two or more linked search space sets includes an instance of a first control channel communication, and where each respective linked search space set of the two or more linked search space sets is associated with a respective control resource set. The operations of 1805 may be performed in accordance with aspects as disclosed herein. In some examples, aspects of the operations of 1805 may be performed by a search space set manager 925 as described with reference to FIG. 9.

At 1810, the method may include receiving, from the second network node, second control information that indicates one or more TCI states of one or more control resource sets associated with the two or more linked search space sets, where the one or more TCI states are used for at least a subset of communications between the first network node and the second network node after a period of time. The operations of 1810 may be performed in accordance with aspects as disclosed herein. In some examples, aspects of the operations of 1810 may be performed by a CORESET manager 930 as described with reference to FIG. 9.

At 1815, the method may include determining that a first control resource set associated with the two or more linked search space sets is a reference control resource set based on a starting or ending time of an associated first search space set relative to other starting or ending times of other of the two or more linked search space sets. The operations of 1815 may be performed in accordance with aspects as disclosed herein. In some examples, aspects of the operations of 1815 may be performed by a TCI state manager 940 as described with reference to FIG. 9.

At 1820, the method may include decoding at least one instance of the first control channel communication from at least one of the two or more linked search space sets, the first control channel communication indicating a resource allocation for a first downlink communication. The operations of 1820 may be performed in accordance with aspects as disclosed herein. In some examples, aspects of the operations of 1820 may be performed by a control channel communications manager 935 as described with reference to FIG. 9.

At 1825, the method may include determining, based on the second control information, whether a first TCI state of the one or more TCI states, or a second TCI state that is different than the one or more TCI states, is used for the first downlink communication. The operations of 1825 may be performed in accordance with aspects as disclosed herein. In some examples, aspects of the operations of 1825 may be performed by a TCI state manager 940 as described with reference to FIG. 9.

At 1830, the method may include receiving, from the second network node, the first downlink communication based on the determined TCI state for the first downlink communication. The operations of 1830 may be performed in accordance with aspects as disclosed herein. In some examples, aspects of the operations of 1830 may be performed by a TCI state manager 940 as described with reference to FIG. 9.

Figure 19:
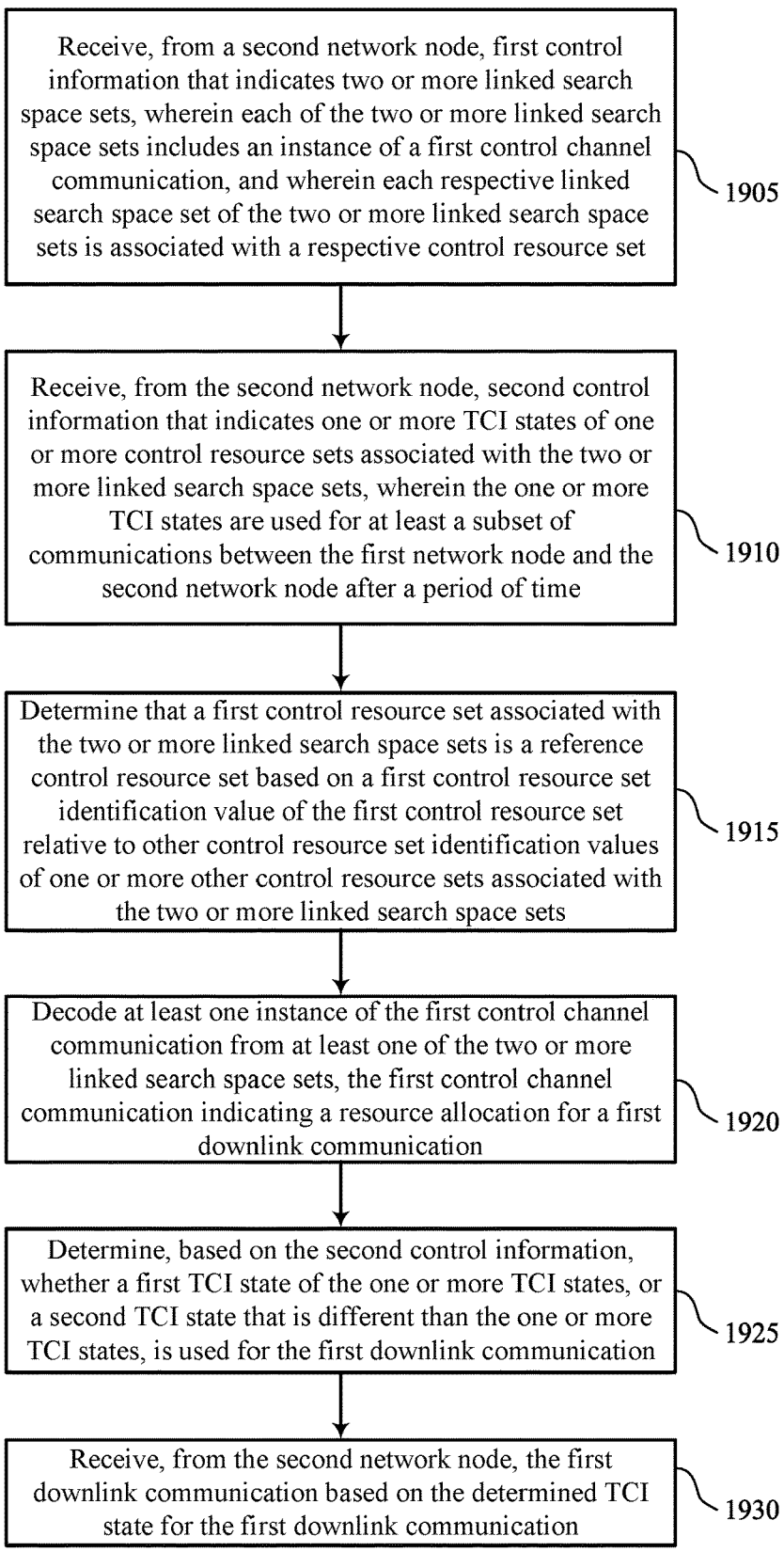

FIG. 19 shows a flowchart illustrating a method 1900 that supports transmission configuration indicator state determination based on multiple control channel repetitions in accordance with aspects of the present disclosure. The operations of the method 1900 may be implemented by a network node (e.g., a UE) or its components as described herein. For example, the operations of the method 1900 may be performed by a UE 115 as described with reference to FIGS. 1 through 10. In some aspects, a node may execute a set of instructions to control the functional elements of the node to perform the described functions. Additionally or alternatively, the node may perform aspects of the described functions using special-purpose hardware.

At 1905, the method may include receiving, from a second network node, first control information that indicates two or more linked search space sets, where each of the two or more linked search space sets includes an instance of a first control channel communication, and where each respective linked search space set of the two or more linked search space sets is associated with a respective control resource set. The operations of 1905 may be performed in accordance with aspects as disclosed herein. In some examples, aspects of the operations of 1905 may be performed by a search space set manager 925 as described with reference to FIG. 9.

At 1910, the method may include receiving, from the second network node, second control information that indicates one or more TCI states of one or more control resource sets associated with the two or more linked search space sets, where the one or more TCI states are used for at least a subset of communications between the first network node and the second network node after a period of time. The operations of 1910 may be performed in accordance with aspects as disclosed herein. In some examples, aspects of the operations of 1910 may be performed by a CORESET manager 930 as described with reference to FIG. 9.

At 1915, the method may include determining that a first control resource set associated with the two or more linked search space sets is a reference control resource set based on a first control resource set identification value of the first control resource set relative to other control resource set identification values of one or more other control resource sets associated with the two or more linked search space sets. The operations of 1915 may be performed in accordance with aspects as disclosed herein. In some examples, aspects of the operations of 1915 may be performed by a TCI state manager 940 as described with reference to FIG. 9.

At 1920, the method may include decoding at least one instance of the first control channel communication from at least one of the two or more linked search space sets, the first control channel communication indicating a resource allocation for a first downlink communication. The operations of 1920 may be performed in accordance with aspects as disclosed herein. In some examples, aspects of the operations of 1920 may be performed by a control channel communications manager 935 as described with reference to FIG. 9.

At 1925, the method may include determining, based on the second control information, whether a first TCI state of the one or more TCI states, or a second TCI state that is different than the one or more TCI states, is used for the first downlink communication. The operations of 1925 may be performed in accordance with aspects as disclosed herein. In some examples, aspects of the operations of 1925 may be performed by a TCI state manager 940 as described with reference to FIG. 9.

At 1930, the method may include receiving, from the second network node, the first downlink communication based on the determined TCI state for the first downlink communication. The operations of 1930 may be performed in accordance with aspects as disclosed herein. In some examples, aspects of the operations of 1930 may be performed by a TCI state manager 940 as described with reference to FIG. 9.

Figure 20:
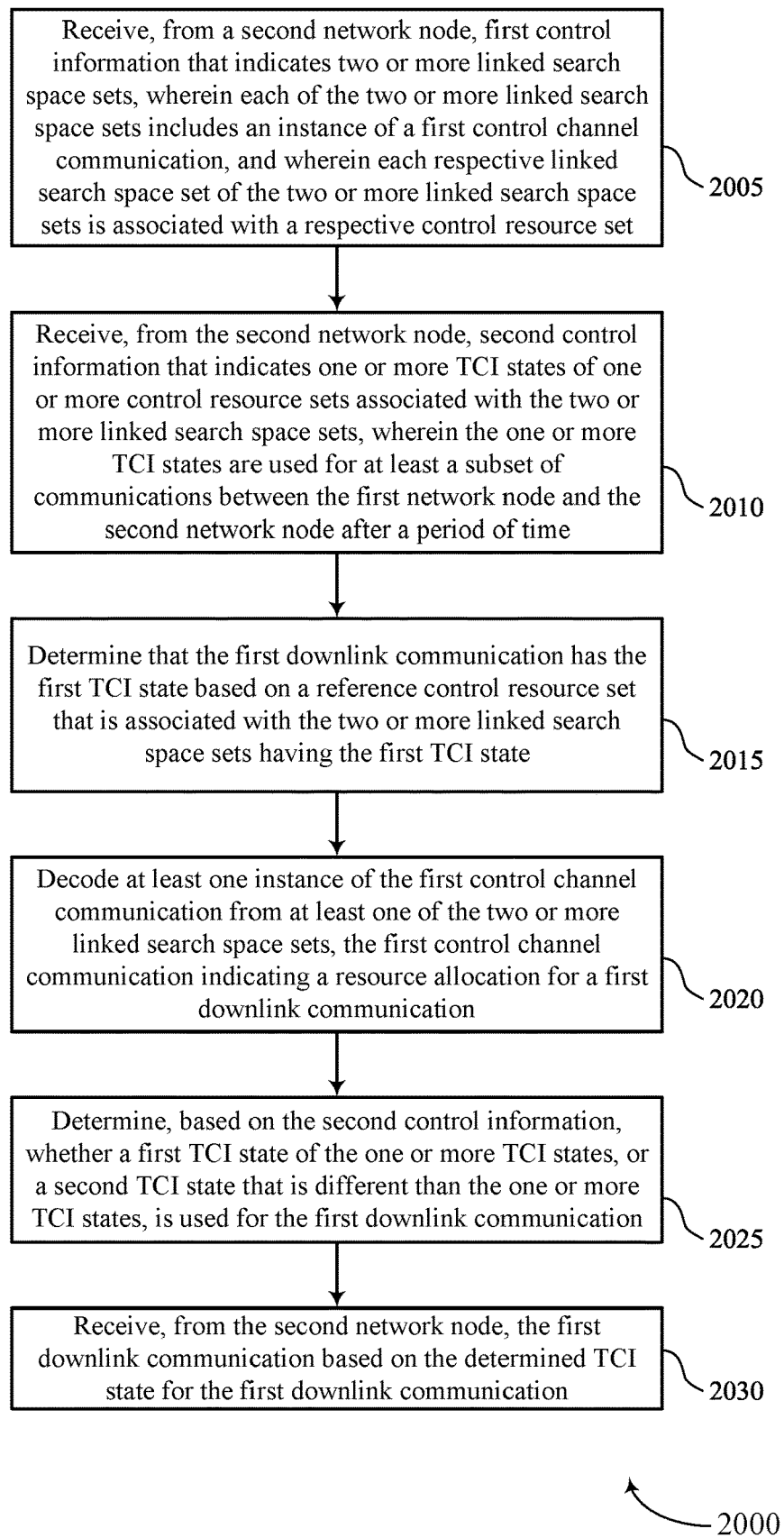

FIG. 20 shows a flowchart illustrating a method 2000 that supports transmission configuration indicator state determination based on multiple control channel repetitions in accordance with aspects of the present disclosure. The operations of the method 2000 may be implemented by a network node (e.g., a UE) or its components as described herein. For example, the operations of the method 2000 may be performed by a UE 115 as described with reference to FIGS. 1 through 10. In some aspects, a node may execute a set of instructions to control the functional elements of the node to perform the described functions. Additionally or alternatively, the node may perform aspects of the described functions using special-purpose hardware.

At 2005, the method may include receiving, from a second network node, first control information that indicates two or more linked search space sets, where each of the two or more linked search space sets includes an instance of a first control channel communication, and where each respective linked search space set of the two or more linked search space sets is associated with a respective control resource set. The operations of 2005 may be performed in accordance with aspects as disclosed herein. In some examples, aspects of the operations of 2005 may be performed by a search space set manager 925 as described with reference to FIG. 9.

At 2010, the method may include receiving, from the second network node, second control information that indicates one or more TCI states of one or more control resource sets associated with the two or more linked search space sets, where the one or more TCI states are used for at least a subset of communications between the first network node and the second network node after a period of time. The operations of 2010 may be performed in accordance with aspects as disclosed herein. In some examples, aspects of the operations of 2010 may be performed by a CORESET manager 930 as described with reference to FIG. 9.

At 2015, the method may include determining that the first downlink communication has the first TCI state based on a reference control resource set that is associated with the two or more linked search space sets having the first TCI state. The operations of 2015 may be performed in accordance with aspects as disclosed herein. In some examples, aspects of the operations of 2015 may be performed by a reference CORESET manager 945 as described with reference to FIG. 9.

At 2020, the method may include decoding at least one instance of the first control channel communication from at least one of the two or more linked search space sets, the first control channel communication indicating a resource allocation for a first downlink communication. The operations of 2020 may be performed in accordance with aspects as disclosed herein. In some examples, aspects of the operations of 2020 may be performed by a control channel communications manager 935 as described with reference to FIG. 9.

At 2025, the method may include determining, based on the second control information, whether a first TCI state of the one or more TCI states, or a second TCI state that is different than the one or more TCI states, is used for the first downlink communication. The operations of 2025 may be performed in accordance with aspects as disclosed herein. In some examples, aspects of the operations of 2025 may be performed by a TCI state manager 940 as described with reference to FIG. 9.

At 2030, the method may include receiving, from the second network node, the first downlink communication based on the determined TCI state for the first downlink communication. The operations of 2030 may be performed in accordance with aspects as disclosed herein. In some examples, aspects of the operations of 2030 may be performed by a TCI state manager 940 as described with reference to FIG. 9.

Figure 21:
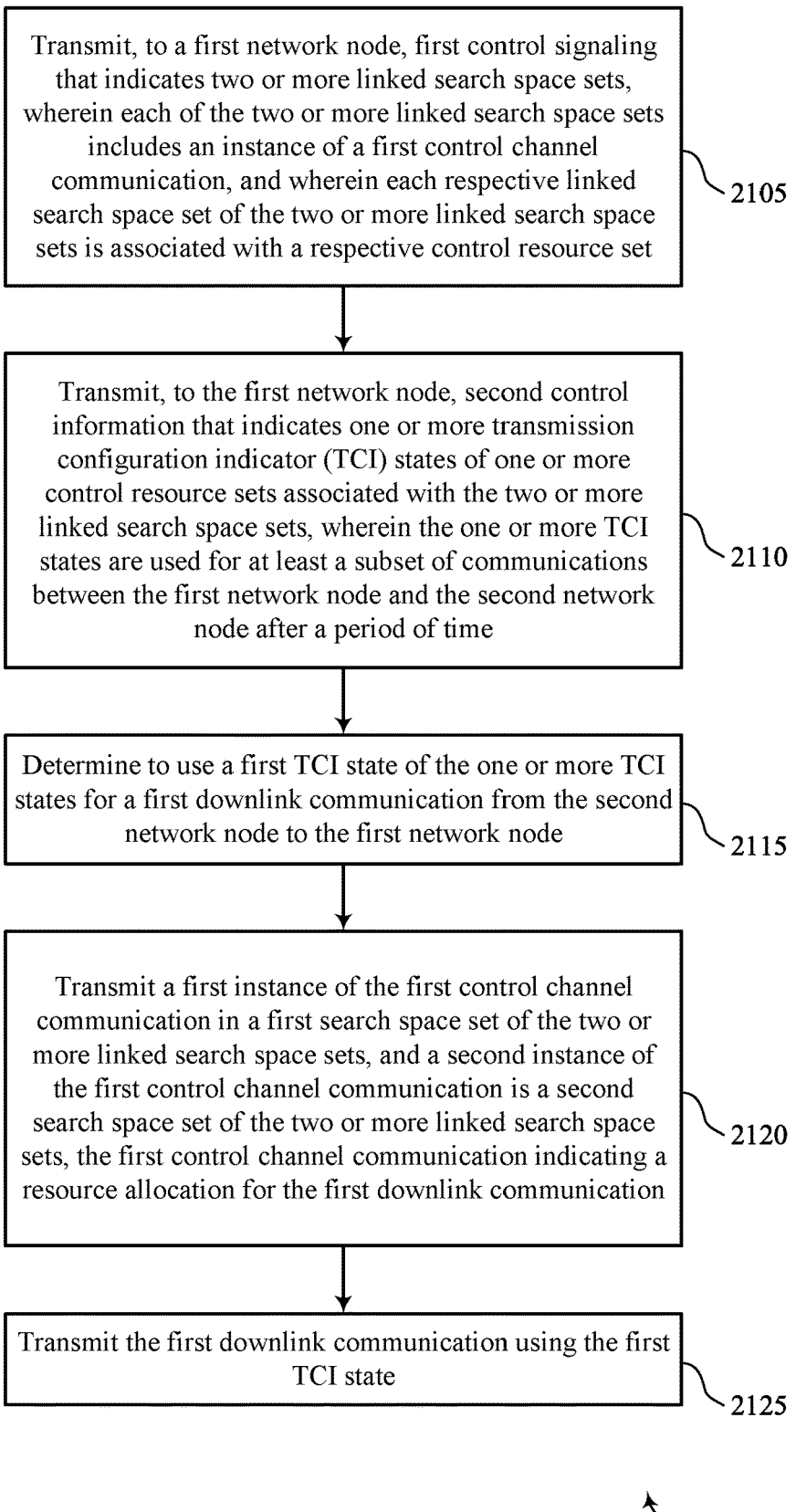

FIG. 21 shows a flowchart illustrating a method 2100 that supports transmission configuration indicator state determination based on multiple control channel repetitions in accordance with aspects of the present disclosure. The operations of the method 2100 may be implemented by a base station or its components as described herein. For example, the operations of the method 2100 may be performed by a network node (e.g., a base station 105) as described with reference to FIGS. 1 through 6 and 11 through 14. In some aspects, a node may execute a set of instructions to control the functional elements of the node to perform the described functions. Additionally or alternatively, the node may perform aspects of the described functions using special-purpose hardware.

At 2105, the method may include transmitting, to a second network node, first control signaling that indicates two or more linked search space sets, where each of the two or more linked search space sets includes an instance of a first control channel communication, and where each respective linked search space set of the two or more linked search space sets is associated with a respective control resource set. The operations of 2105 may be performed in accordance with aspects as disclosed herein. In some examples, aspects of the operations of 2105 may be performed by a search space set manager 1325 as described with reference to FIG. 13.

At 2110, the method may include transmitting, to the second network node, second control information that indicates one or more TCI states of one or more control resource sets associated with the two or more linked search space sets, where the one or more TCI states are used for at least a subset of communications between the first network node and the second network node after a period of time. The operations of 2110 may be performed in accordance with aspects as disclosed herein. In some examples, aspects of the operations of 2110 may be performed by a CORESET manager 1330 as described with reference to FIG. 13.

At 2115, the method may include determining to use a first TCI state of the one or more TCI states for a first downlink communication from the first network node to the second network node. The operations of 2115 may be performed in accordance with aspects as disclosed herein. In some examples, aspects of the operations of 2115 may be performed by a TCI state manager 1335 as described with reference to FIG. 13.

At 2120, the method may include transmitting a first instance of the first control channel communication in a first search space set of the two or more linked search space sets, and a second instance of the first control channel communication in a second search space set of the two or more linked search space sets, the first control channel communication indicating a resource allocation for the first downlink communication. The operations of 2120 may be performed in accordance with aspects as disclosed herein. In some examples, aspects of the operations of 2120 may be performed by a control channel communications manager 1340 as described with reference to FIG. 13.

At 2125, the method may include transmitting the first downlink communication using the first TCI state. The operations of 2125 may be performed in accordance with aspects as disclosed herein. In some examples, aspects of the operations of 2125 may be performed by a TCI state manager 1335 as described with reference to FIG. 13.

Figure 22:
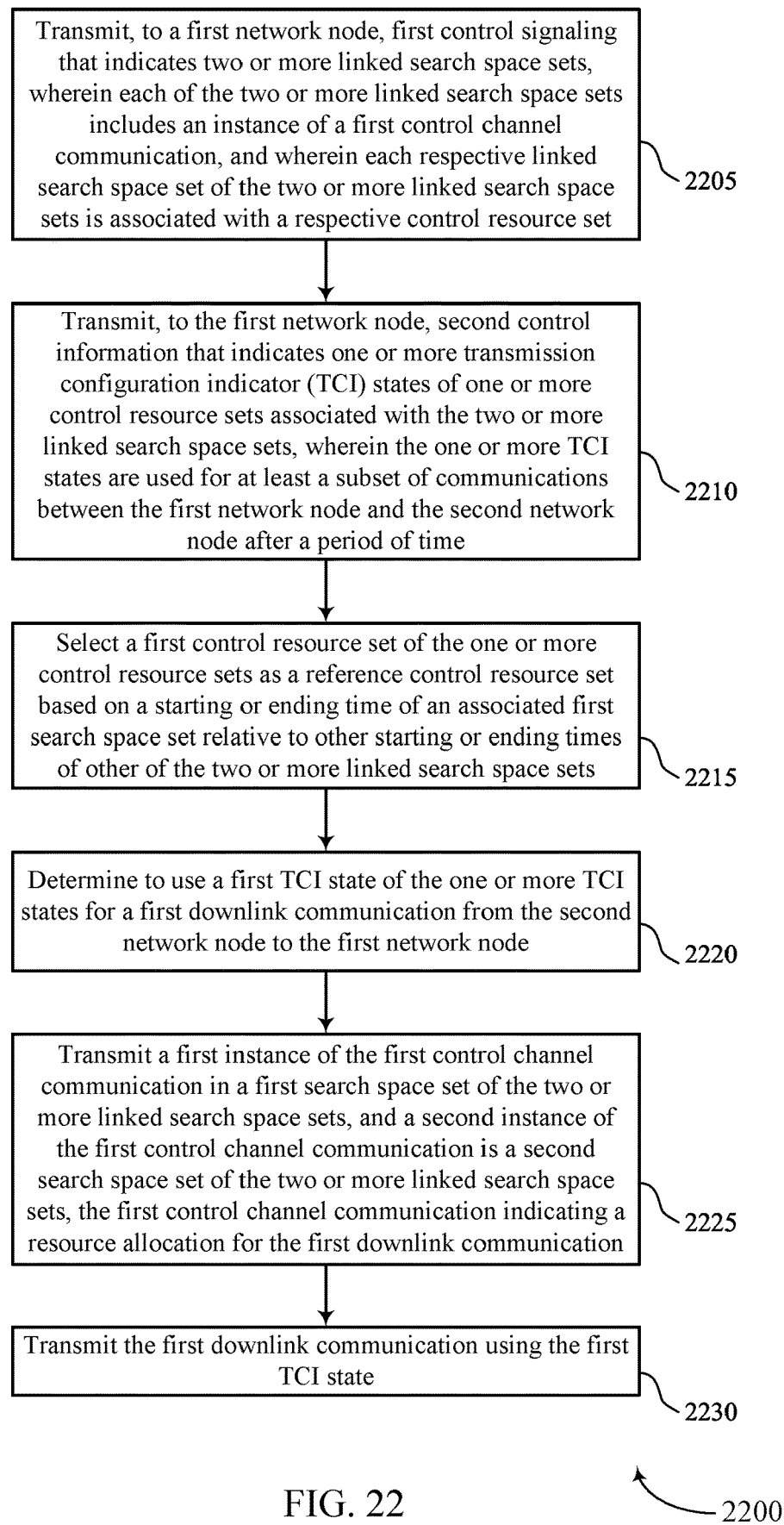

FIG. 22 shows a flowchart illustrating a method 2200 that supports transmission configuration indicator state determination based on multiple control channel repetitions in accordance with aspects of the present disclosure. The operations of the method 2200 may be implemented by a network node (e.g., a base station) or its components as described herein. For example, the operations of the method 2200 may be performed by a base station 105 as described with reference to FIGS. 1 through 6 and 11 through 14. In some aspects, a node may execute a set of instructions to control the functional elements of the node to perform the described functions. Additionally or alternatively, the node may perform aspects of the described functions using special-purpose hardware.

At 2205, the method may include transmitting, to a second network node, first control signaling that indicates two or more linked search space sets, where each of the two or more linked search space sets includes an instance of a first control channel communication, and where each respective linked search space set of the two or more linked search space sets is associated with a respective control resource set. The operations of 2205 may be performed in accordance with aspects as disclosed herein. In some examples, aspects of the operations of 2205 may be performed by a search space set manager 1325 as described with reference to FIG. 13.

At 2210, the method may include transmitting, to the second network node, second control information that indicates one or more TCI states of one or more control resource sets associated with the two or more linked search space sets, where the one or more TCI states are used for at least a subset of communications between the first network node and the second network node after a period of time. The operations of 2210 may be performed in accordance with aspects as disclosed herein. In some examples, aspects of the operations of 2210 may be performed by a CORESET manager 1330 as described with reference to FIG. 13.

At 2215, the method may include selecting a first control resource set of the one or more control resource sets as a reference control resource set based on a starting or ending time of an associated first search space set relative to other starting or ending times of other of the two or more linked search space sets. The operations of 2215 may be performed in accordance with aspects as disclosed herein. In some examples, aspects of the operations of 2215 may be performed by a reference CORESET manager 1345 as described with reference to FIG. 13.

At 2220, the method may include determining to use a first TCI state of the one or more TCI states for a first downlink communication from the first network node to the second network node. The operations of 2220 may be performed in accordance with aspects as disclosed herein. In some examples, aspects of the operations of 2220 may be performed by a TCI state manager 1335 as described with reference to FIG. 13.

At 2225, the method may include transmitting a first instance of the first control channel communication in a first search space set of the two or more linked search space sets, and a second instance of the first control channel communication in a second search space set of the two or more linked search space sets, the first control channel communication indicating a resource allocation for the first downlink communication. The operations of 2225 may be performed in accordance with aspects as disclosed herein. In some examples, aspects of the operations of 2225 may be performed by a control channel communications manager 1340 as described with reference to FIG. 13.

At 2230, the method may include transmitting the first downlink communication using the first TCI state. The operations of 2230 may be performed in accordance with aspects as disclosed herein. In some examples, aspects of the operations of 2230 may be performed by a TCI state manager 1335 as described with reference to FIG. 13.

The following provides an overview of aspects of the present disclosure:

Aspect 1: A method of wireless communication performed by a first network node, comprising: receiving, from a second network node, first control information that indicates two or more linked SS sets, wherein each of the two or more linked SS sets includes an instance of a first control channel communication, and wherein each respective linked SS set of the two or more linked SS sets is associated with a respective CORESET; receiving, from the second network node or a third network node, second control information that indicates one or more transmission configuration indicator (TCI) states of one or more CORESETs associated with the two or more linked SS sets, wherein the one or more TCI states are used for at least a subset of communications between the first network node and the second network node or the third network node after a period of time; decoding at least one instance of the first control channel communication from at least one of the two or more linked SS sets, the first control channel communication indicating a resource allocation for a first downlink communication; determining, based on the second control information, whether a first TCI state of the one or more TCI states, or a second TCI state that is different than the one or more TCI states, is used for the first downlink communication; and receiving, from the second network node or the third network node, the first downlink communication based on the determining.

Aspect 2: The method of aspect 1, wherein the determining comprises: determining that the first downlink communication has the first TCI state based on a reference CORESET that is associated with the two or more linked SS sets having the first TCI state.

Aspect 3: The method of any of aspects 1 through 2, wherein the first control information includes information indicative of a monitoring occasion and an associated CORESET for each SS set of the two or more linked SS sets, wherein each respective CORESET has an associated TCI state.

Aspect 4: The method of any of aspects 1 through 3, further comprising: determining that a first CORESET associated with the two or more linked SS sets is a reference CORESET based on a first CORESET identification value of the first CORESET relative to other CORESET identification values of one or more other CORESETs associated with the two or more linked SS sets.

Aspect 5: The method of any of aspects 1 through 4, further comprising: determining that a first CORESET associated with the two or more linked SS sets is a reference CORESET based on an index value of an associated first SS set relative to index values of one or more other of the two or more linked SS sets.

Aspect 6: The method of any of aspects 1 through 5, further comprising: determining that a first CORESET associated with the two or more linked SS sets is a reference CORESET based on a starting or ending time of an associated first SS set relative to other starting or ending times of other of the two or more linked SS sets.

Aspect 7: The method of any of aspects 1 through 6, further comprising: determining that a first CORESET associated with the two or more linked SS sets is a reference CORESET based on a CORESET type of each of two or more CORESETs associated with the two or more linked SS sets.

Aspect 8: The method of aspect 7, wherein the first CORESET has a predetermined CORESET type of a plurality of available CORESET types.

Aspect 9: The method of any of aspects 7 through 8, wherein the first CORESET has a respective CORESET type that provides dedicated reception for the first network node.

Aspect 10: The method of any of aspects 7 through 8, wherein the first CORESET has a respective CORESET type that provides non-dedicated reception for the first network node.

Aspect 11: The method of any of aspects 7 through 10, wherein the first CORESET is determined to be the reference CORESET based at on a CORESET type priority order and a first CORESET type of the first CORESET.

Aspect 12: The method of aspect 1, wherein a TCI state of a reference CORESET is used for receiving the first downlink communication, and wherein the reference CORESET is determined based on a CORESET type of the reference CORESET.

Aspect 13: The method of aspect 12, wherein each CORESET associated with each of the two or more linked SS sets has a same CORESET type that corresponds to the reference CORESET.

Aspect 14: The method of any of aspects 12 through 13, wherein each CORESET associated with each of the two or more linked SS sets has an associated CORESET type that is included in a subset of a set of available CORESET types, and is selectable as the reference CORESET.

Aspect 15: The method of any of aspects 12 through 14, wherein the reference CORESET is selected based on a radio network temporary identifier associated with the first control channel communication.

Aspect 16: The method of any of aspects 1 through 15, wherein the second network node and the third network node are the same.

Aspect 17: The method of any of aspects 1 through 15, wherein the second network node and the third network node are different.

Aspect 18: A method of wireless communication performed by a first network node, comprising: transmitting, to a second network node, first control signaling that indicates two or more linked SS sets, wherein each of the two or more linked SS sets includes an instance of a first control channel communication, and wherein each respective linked SS set of the two or more linked SS sets is associated with a respective CORESET; transmitting, to the second network node, second control information that indicates one or more TCI states of one or more CORESETs associated with the two or more linked SS sets, wherein the one or more TCI states are used for at least a subset of communications between the first network node and the second network node after a period of time; determining to use a first TCI state of the one or more TCI states for a first downlink communication from the first network node to the second network node; transmitting a first instance of the first control channel communication in a first SS set of the two or more linked SS sets, and a second instance of the first control channel communication in a second SS set of the two or more linked SS sets, the first control channel communication indicating a resource allocation for the first downlink communication; and transmitting the first downlink communication using the first TCI state.

Aspect 19: The method of aspect 18, wherein the first TCI state is applied to the first downlink communication based on a reference CORESET that is associated with the two or more linked SS sets having the first TCI state.

Aspect 20: The method of any of aspects 18 through 19, wherein the first control information includes information indicative of a monitoring occasion and an associated CORESET for each SS set of the two or more linked SS sets, wherein each respective CORESET has an associated transmission configuration indicator state.

Aspect 21: The method of any of aspects 18 through 20, further comprising: determining that a first CORESET associated with the two or more linked SS sets is a reference CORESET based on a first CORESET identification value of the first CORESET relative to other CORESET identification values of one or more other CORESETs associated with the two or more linked SS sets.

Aspect 22: The method of any of aspects 18 through 21, further comprising: determining that a first CORESET associated with the two or more linked SS sets is a reference CORESET based on a CORESET type of each of two or more CORESETs associated with the two or more linked SS sets.

Aspect 23: The method of any of aspects 18 through 22, further comprising: determining that a first CORESET associated with the two or more linked SS sets is a reference CORESET based on an index value of an associated first SS set relative to index values of one or more other of the two or more linked SS sets.

Aspect 24: The method of aspect 23, wherein the first CORESET is selected as the reference CORESET based on one or more of a predetermined first CORESET type of a plurality of available CORESET types, an associated CORESET type that provides dedicated reception for the second network node, an associated CORESET type that provides non-dedicated reception for the second network node, or a CORESET type priority order.

Aspect 25: The method of any of aspects 18 through 24, further comprising: selecting a first CORESET of the one or more CORESETs as a reference CORESET based on a starting or ending time of an associated first SS set relative to other starting or ending times of other of the two or more linked SS sets.

Aspect 26: The method of any of aspects 18 through 25, wherein the TCI state of a reference CORESET is used for transmitting the first downlink communication, and wherein the reference CORESET is determined based on a CORESET type of the reference CORESET.

Aspect 27: A network node comprising at least one processor; and memory coupled with the at least one processor, wherein the at least one processor is configured to perform a method of any of aspects 1 through 17.

Aspect 28: An apparatus comprising at least one means for performing a method of any of aspects 1 through 17.

Aspect 29: A non-transitory computer-readable medium storing code the code comprising instructions executable by a processor to perform a method of any of aspects 1 through 17.

Aspect 30: A network node comprising at least one processor; and memory coupled with the at least one processor, wherein the at least one processor is configured to perform a method of any of aspects 18 through 26.

Aspect 31: An apparatus comprising at least one means for performing a method of any of aspects 18 through 26.

Aspect 32: A non-transitory computer-readable medium storing code the code comprising instructions executable by a processor to perform a method of any of aspects 18 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of information, one or more conditions, one or more factors, or the like. For example, the phrase "based on A" (where "A" may be information, a condition, a factor, or the like) may be interpreted as: "based at least on A." In other words, as used herein, the phrase "based on" shall be construed in the same manner as the phrase "based at least on."

The term "determine" or "determining" encompasses a wide variety of actions and, therefore, "determining" can include calculating, computing, processing, deriving, investigating, looking up (such as via looking up in a table, a database or another data structure), ascertaining, and the like. Also, "determining" can include receiving (such as receiving information), accessing (such as accessing data in a memory) and the like. Also, "determining" can include resolving, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "example" used herein means "serving as an example, instance, or illustration," and not "preferred" or "advantageous over other examples." The term "aspect" used herein means "serving as an example, instance, or illustration," and not "preferred" or "advantageous over other aspects." The detailed description includes specific details for the purpose of providing an understanding of the described techniques. These techniques, however, may be practiced without these specific details.

The description herein enables a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs of the various aspects described herein but is to be accorded the broadest scope consistent with the principles and novel features disclosed herein.

What is claimed is:

1. A first network node for wireless communication, comprising:
    at least one processor; and
    memory coupled with the at least one processor, wherein the at least one processor is configured to:
        receive, from a second network node, first control information that indicates two or more linked search space sets, wherein each of the two or more linked search space sets includes an instance of a first control channel communication, and wherein each respective linked search space set of the two or more linked search space sets is associated with a respective control resource set;
        receive, from the second network node, second control information that indicates one or more transmission configuration indicator (TCI) states of one or more control resource sets associated with the two or more linked search space sets, wherein the one or more TCI states are used for at least a subset of communications between the first network node and the second network node after a period of time;
        decode at least one instance of the first control channel communication from at least one of the two or more linked search space sets, wherein the first control channel communication indicates a resource allocation for a first downlink communication;
        determine whether a first TCI state of the one or more TCI states or a second TCI state that is different than the one or more TCI states is used for the first downlink communication based on the second control information and based on a reference control resource set that is associated with the two or more linked search space sets having the first TCI state, wherein a first control resource set associated with the two or more linked search space sets is the reference control resource set based on a control resource set type of each of two or more control resource sets associated with the two or more linked search space sets; and
        receive, from the second network node, the first downlink communication based on the determination.

2. The first network node of claim 1, wherein:
the first control information includes information indicative of a monitoring occasion and an associated control resource set for each search space set of the two or more linked search space sets, wherein each respective control resource set has an associated TCI state.

3. The first network node of claim 1, wherein the at least one processor is configured to:
    determine that a first control resource set associated with the two or more linked search space sets is the reference control resource set based on a first control resource set identification value of the first control resource set relative to other control resource set identification values of one or more other control resource sets associated with the two or more linked search space sets.

4. The first network node of claim 1, wherein the at least one processor is configured to:
    determine that a first control resource set associated with the two or more linked search space sets is the reference control resource set based on an index value of an associated first search space set relative to index values of one or more other of the two or more linked search space sets.

5. The first network node of claim 1, wherein the at least one processor is configured to:
    determine that a first control resource set associated with the two or more linked search space sets is the reference control resource set based on a starting or ending time of an associated first search space set relative to other starting or ending times of other of the two or more linked search space sets.

6. The first network node of claim 1, wherein the first control resource set has a predetermined control resource set type of a plurality of available control resource set types.

7. The first network node of claim 1, wherein the first control resource set has a respective control resource set type that provides dedicated reception for the first network node.

8. The first network node of claim 1, wherein the first control resource set has a respective control resource set type that provides non-dedicated reception for the first network node.

9. The first network node of claim 1, wherein the first control resource set is determined to be the reference control resource set based at on a control resource set type priority order and a first control resource set type of the first control resource set.

10. The first network node of claim 1, wherein a TCI state of the reference control resource set is used for receiving the first downlink communication, and wherein the reference control resource set is determined based on a control resource set type of the reference control resource set.

11. The first network node of claim 10, wherein each control resource set associated with each of the two or more linked search space sets has a same control resource set type that corresponds to the reference control resource set.

12. The first network node of claim 10, wherein each control resource set associated with each of the two or more linked search space sets has an associated control resource set type that is included in a subset of a set of available control resource set types, and is selectable as the reference control resource set.

13. The first network node of claim 10, wherein the reference control resource set is selected based on a radio network temporary identifier associated with the first control channel communication.

14. A first network node for wireless communication, comprising:
at least one processor; and
memory coupled with the at least one processor, wherein the at least one processor is configured to:
transmit, to a second network node, first control information that indicates two or more linked search space sets, wherein each of the two or more linked search space sets includes an instance of a first control channel communication, and wherein each respective linked search space set of the two or more linked search space sets is associated with a respective control resource set;
transmit, to the second network node, second control information that indicates one or more transmission configuration indicator (TCI) states of one or more control resource sets associated with the two or more linked search space sets, wherein the one or more TCI states are used for at least a subset of communications between the first network node and the second network node after a period of time;
determine to use a first TCI state of the one or more TCI states for a first downlink communication from the first network node to the second network node based on a reference control resource set that is associated with the two or more linked search space sets having the first TCI state, wherein a first control resource set associated with the two or more linked search space sets is the reference control resource set based on a control resource set type of each of two or more control resource sets associated with the two or more linked search space sets;
transmit a first instance of the first control channel communication in a first search space set of the two or more linked search space sets, and a second instance of the first control channel communication in a second search space set of the two or more linked search space sets, wherein the first control channel communication indicates a resource allocation for the first downlink communication; and
transmit the first downlink communication using the first TCI state.

15. The first network node of claim 14, wherein:
the first control information includes information indicative of a monitoring occasion and an associated control resource set for each search space set of the two or more linked search space sets, wherein each respective control resource set has an associated transmission configuration indicator state.

16. The first network node of claim 14, wherein the at least one processor is configured to:
determine that a first control resource set associated with the two or more linked search space sets is the reference control resource set based on a first control resource set identification value of the first control resource set relative to other control resource set identification values of one or more other control resource sets associated with the two or more linked search space sets.

17. The first network node of claim 14, wherein the at least one processor is configured to:
determine that a first control resource set associated with the two or more linked search space sets is the reference control resource set based on an index value of an associated first search space set relative to index values of one or more other of the two or more linked search space sets.

18. The first network node of claim 14, wherein the first control resource set is determined to be the reference control resource set based on one or more of:
a predetermined first control resource set type of a plurality of available control resource set types, an associated control resource set type that provides dedicated reception for the second network node, an associated control resource set type that provides non-dedicated reception for the second network node, or
a control resource set type priority order.

19. The first network node of claim 14, wherein the at least one processor is configured to:
select a first control resource set of the one or more control resource sets as the reference control resource set based on a starting or ending time of an associated first search space set relative to other starting or ending times of other of the two or more linked search space sets.

20. The first network node of claim 14, wherein the TCI state of the reference control resource set is used for transmission of the first downlink communication, and wherein the reference control resource set is determined based on a control resource set type of the reference control resource set.

21. A method of wireless communication performed by a first network node, comprising:
receiving, from a second network node, first control information that indicates two or more linked search space sets, wherein each of the two or more linked search space sets includes an instance of a first control channel communication, and wherein each respective linked search space set of the two or more linked search space sets is associated with a respective control resource set;

receiving, from the second network node, second control information that indicates one or more transmission configuration indicator (TCI) states of one or more control resource sets associated with the two or more linked search space sets, wherein the one or more TCI states are used for at least a subset of communications between the first network node and the second network node after a period of time;

decoding at least one instance of the first control channel communication from at least one of the two or more linked search space sets, wherein the first control channel communication indicates a resource allocation for a first downlink communication;

determining whether a first TCI state of the one or more TCI states or a second TCI state that is different than the one or more TCI states is used for the first downlink communication based on the second control information and based on a reference control resource set that is associated with the two or more linked search space sets having the first TCI, wherein a first control resource set associated with the two or more linked search space sets is the reference control resource set based on a control resource set type of each of two or more control resource sets associated with the two or more linked search space sets; and receiving, from the second network node, the first downlink communication based on the determination.

22. A method of wireless communication performed by a first network node, comprising:

transmitting, to a second network node, first control information that indicates two or more linked search space sets, wherein each of the two or more linked search space sets includes an instance of a first control channel communication, and wherein each respective linked search space set of the two or more linked search space sets is associated with a respective control resource set;

transmitting, to the second network node, second control information that indicates one or more transmission configuration indicator (TCI) states of one or more control resource sets associated with the two or more linked search space sets, wherein the one or more TCI states are used for at least a subset of communications between the first network node and the second network node after a period of time;

determining to use a first TCI state of the one or more TCI states for a first downlink communication from the first network node to the second network node based on a reference control resource set that is associated with the two or more linked search space sets having the first TCI state, wherein a first control resource set associated with the two or more linked search space sets is the reference control resource set based on a control resource set type of each of two or more control resource sets associated with the two or more linked search space sets;

transmitting a first instance of the first control channel communication in a first search space set of the two or more linked search space sets, and a second instance of the first control channel communication in a second search space set of the two or more linked search space sets, the first control channel communication indicating a resource allocation for the first downlink communication; and transmitting the first downlink communication using the first TCI state.

23. The method of claim 22, wherein:

the first control information includes information indicative of a monitoring occasion and an associated control resource set for each search space set of the two or more linked search space sets, wherein each respective control resource set has an associated transmission configuration indicator state.

\* \* \* \* \*